Jan. 23, 1973 R. B. KUHN 3,712,957
APPARATUS AND INFORMATION PROCESSING METHODS
FOR A TRACKING SYSTEM TRACKER UNIT
Filed Oct. 12, 1964 12 Sheets-Sheet 1
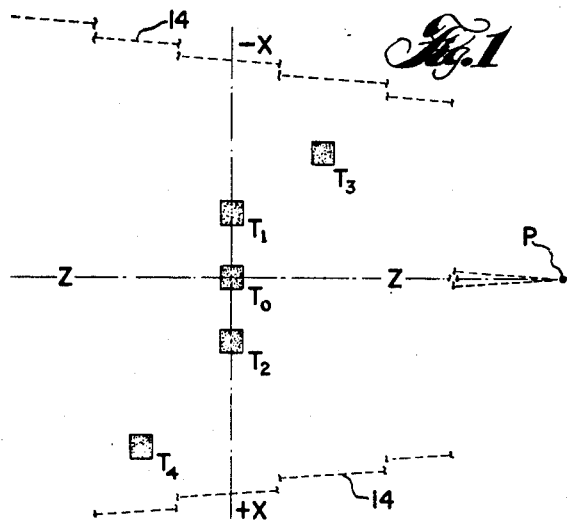
Fig. 1
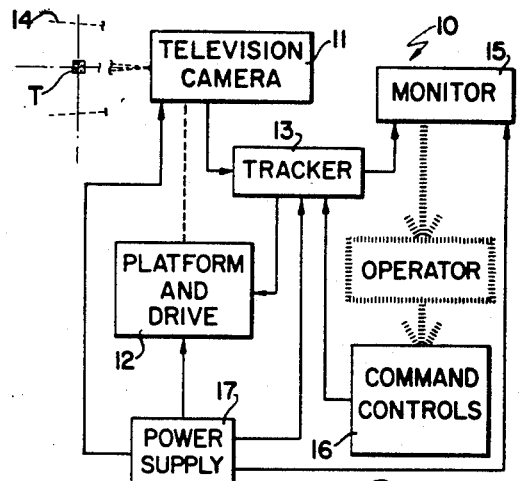
Fig. 3
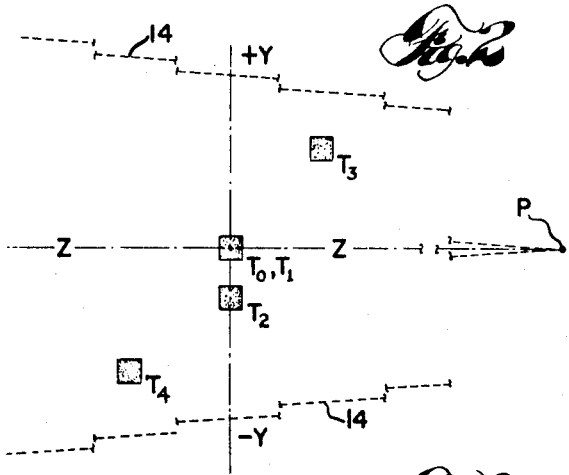
Fig. 2
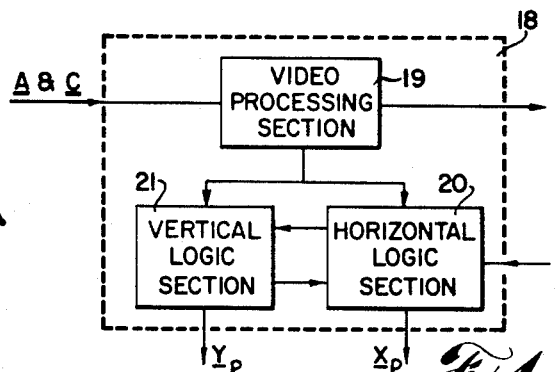
Fig. 4
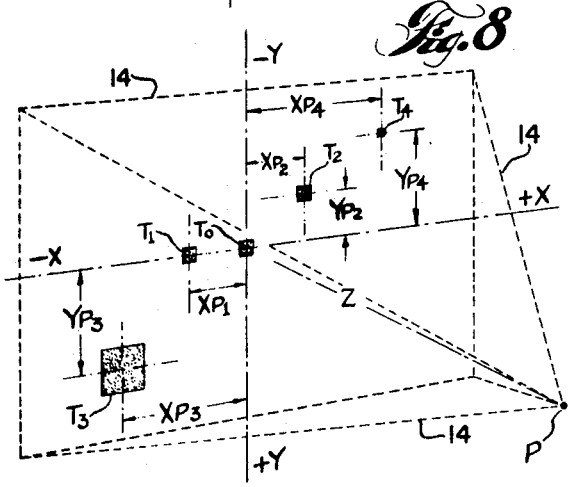
Fig. 8
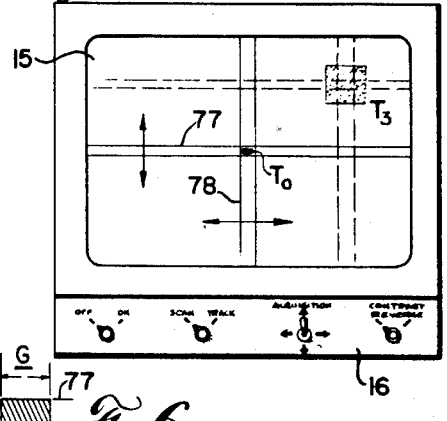
Fig. 5
Fig. 6
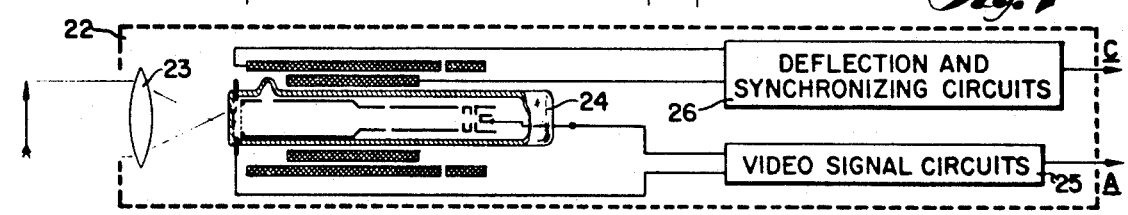
Fig. 7

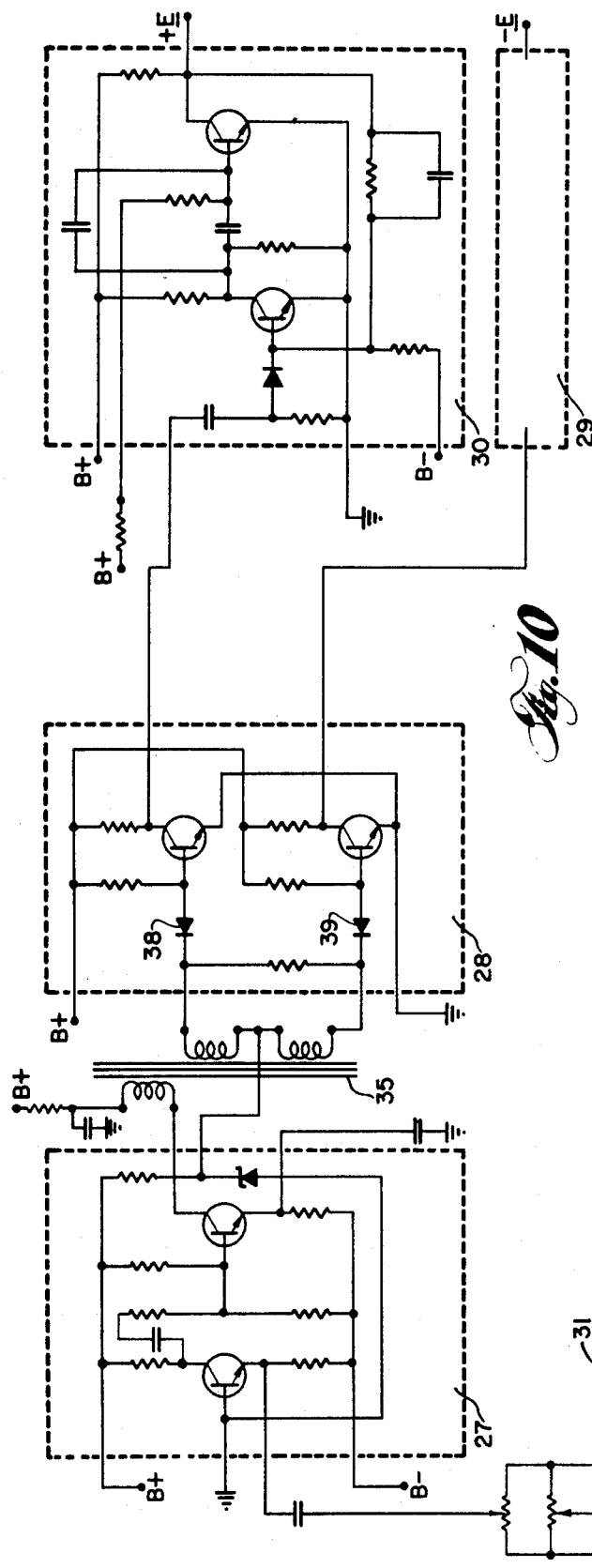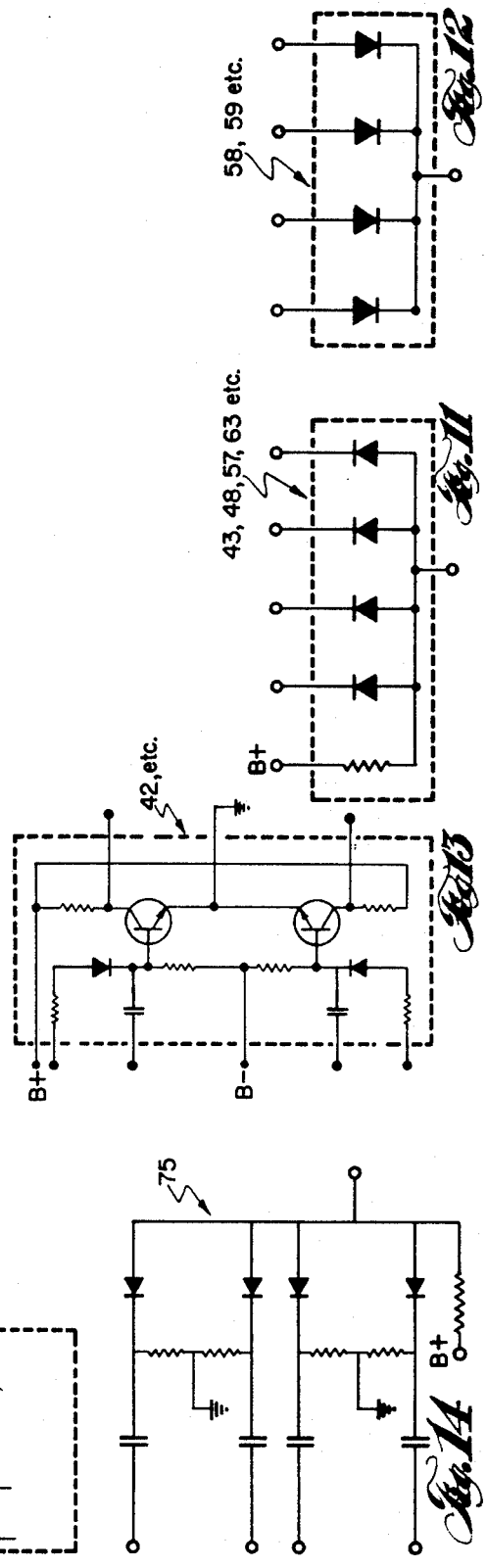

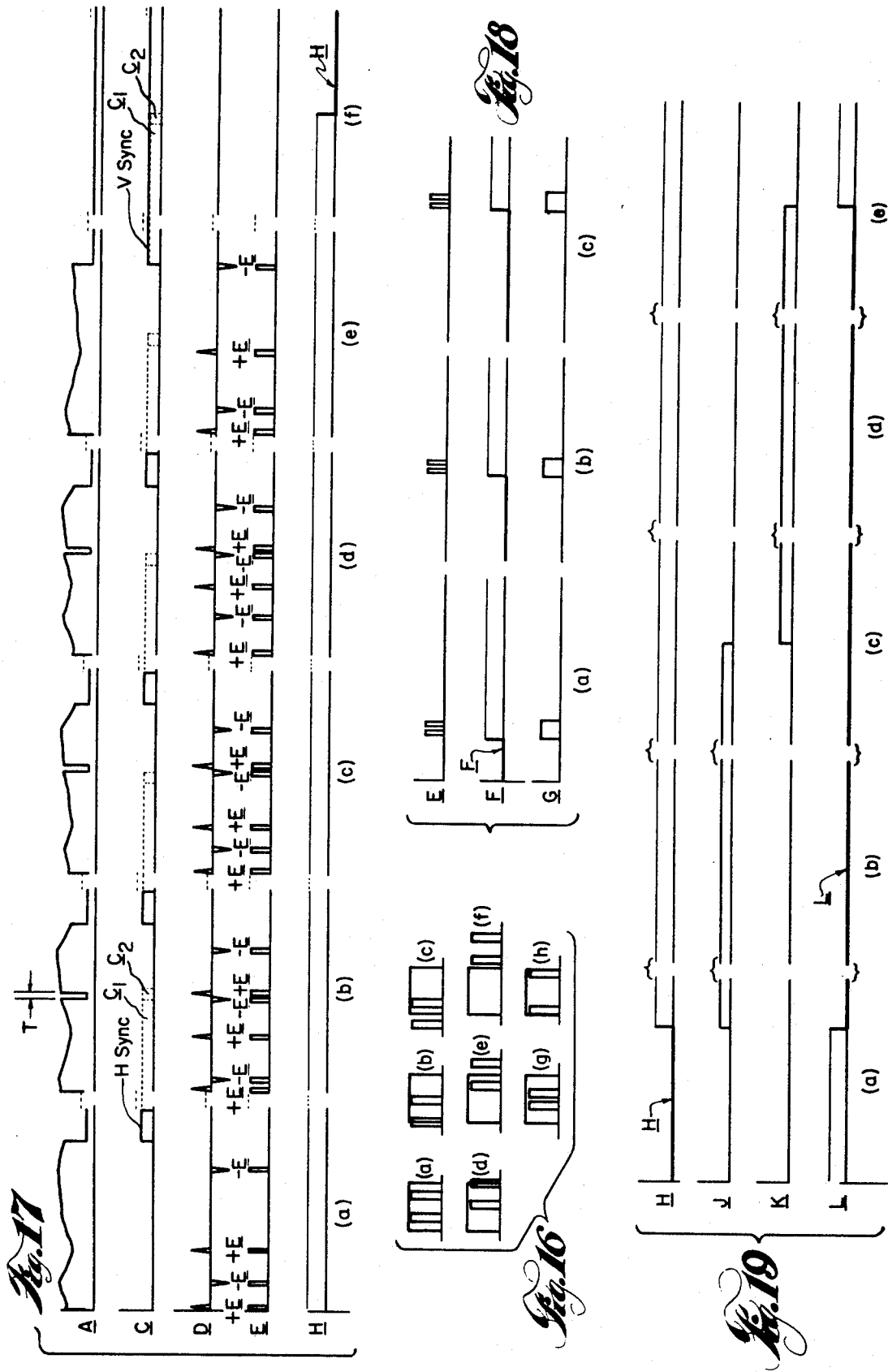

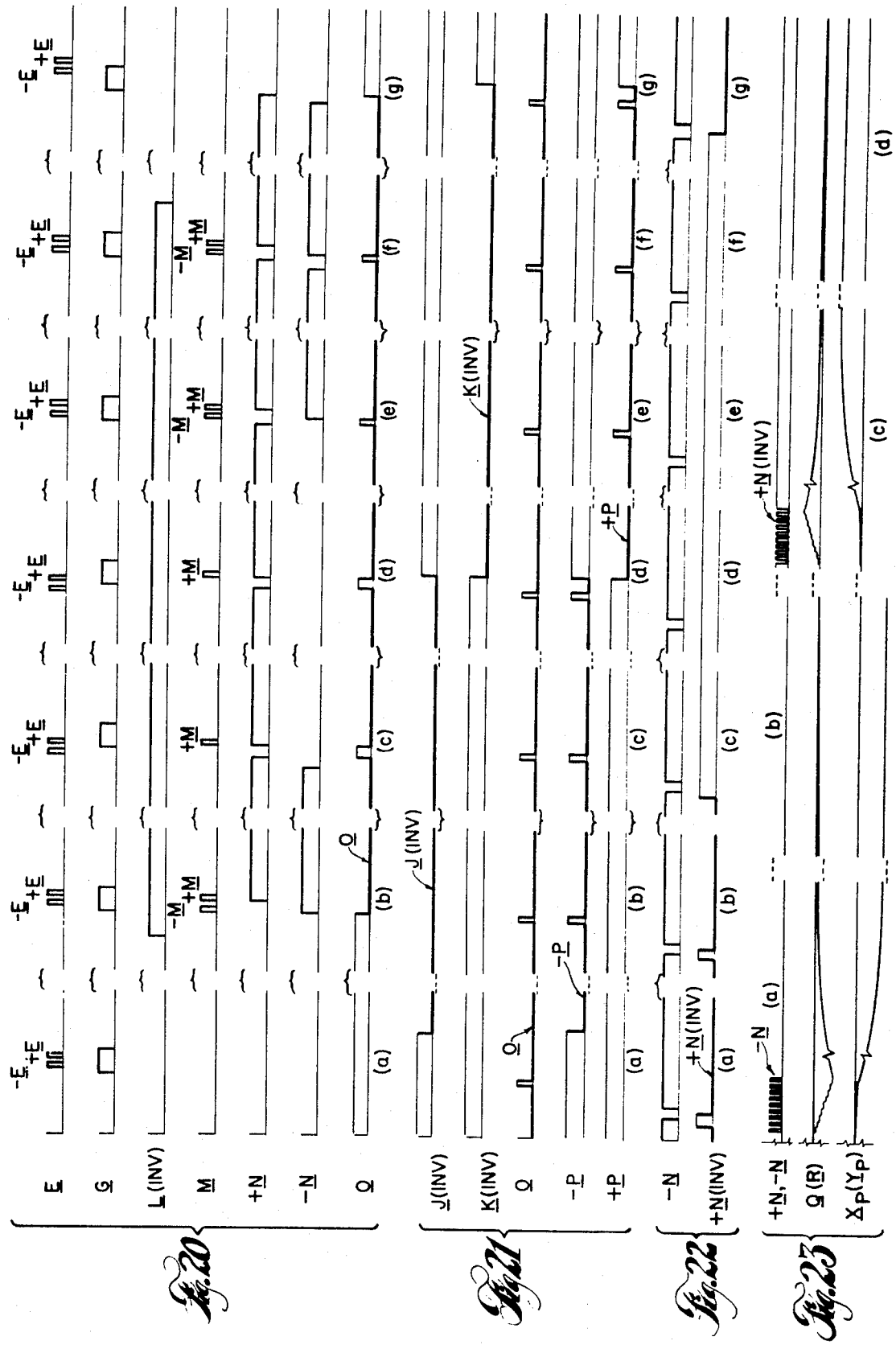

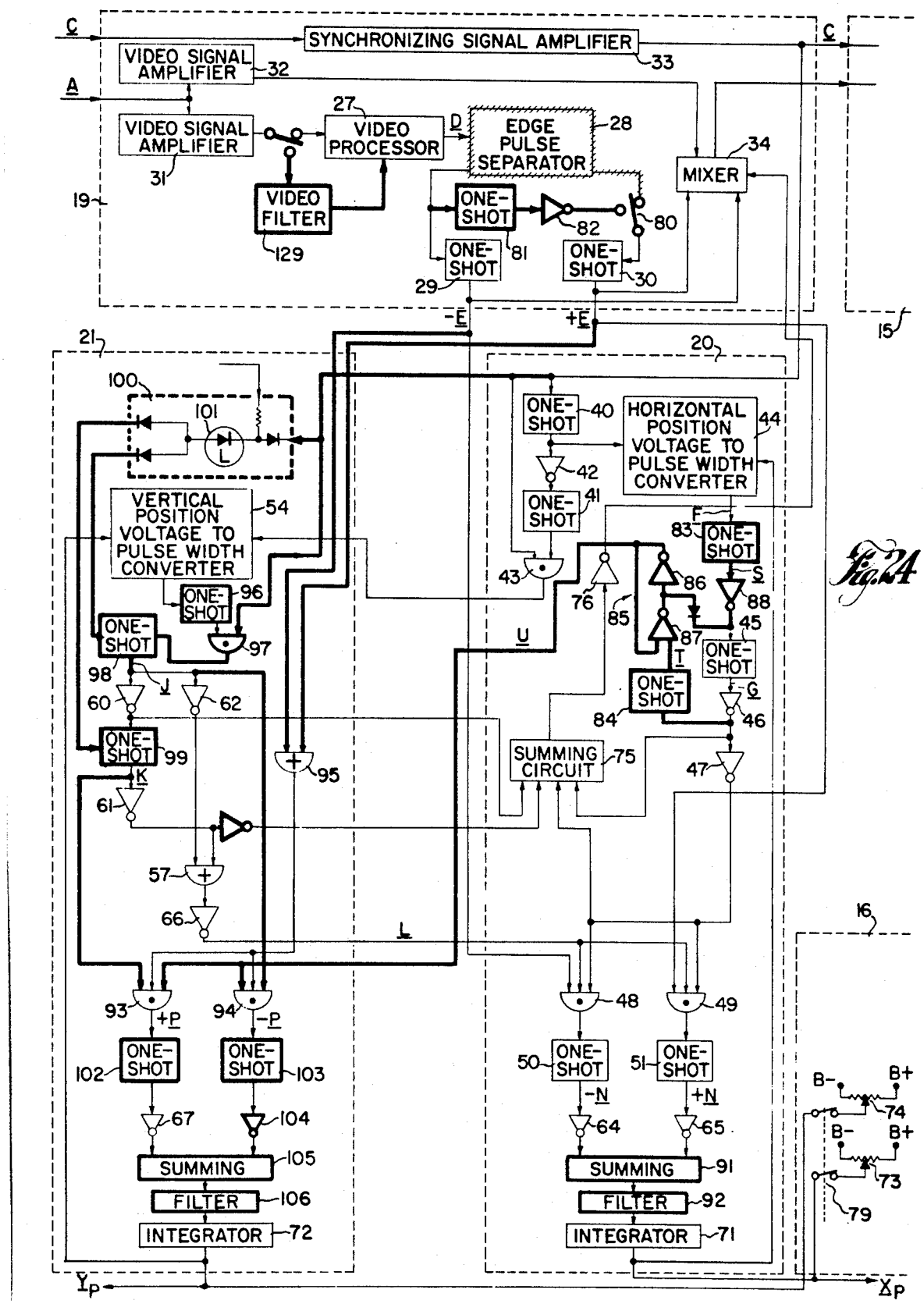

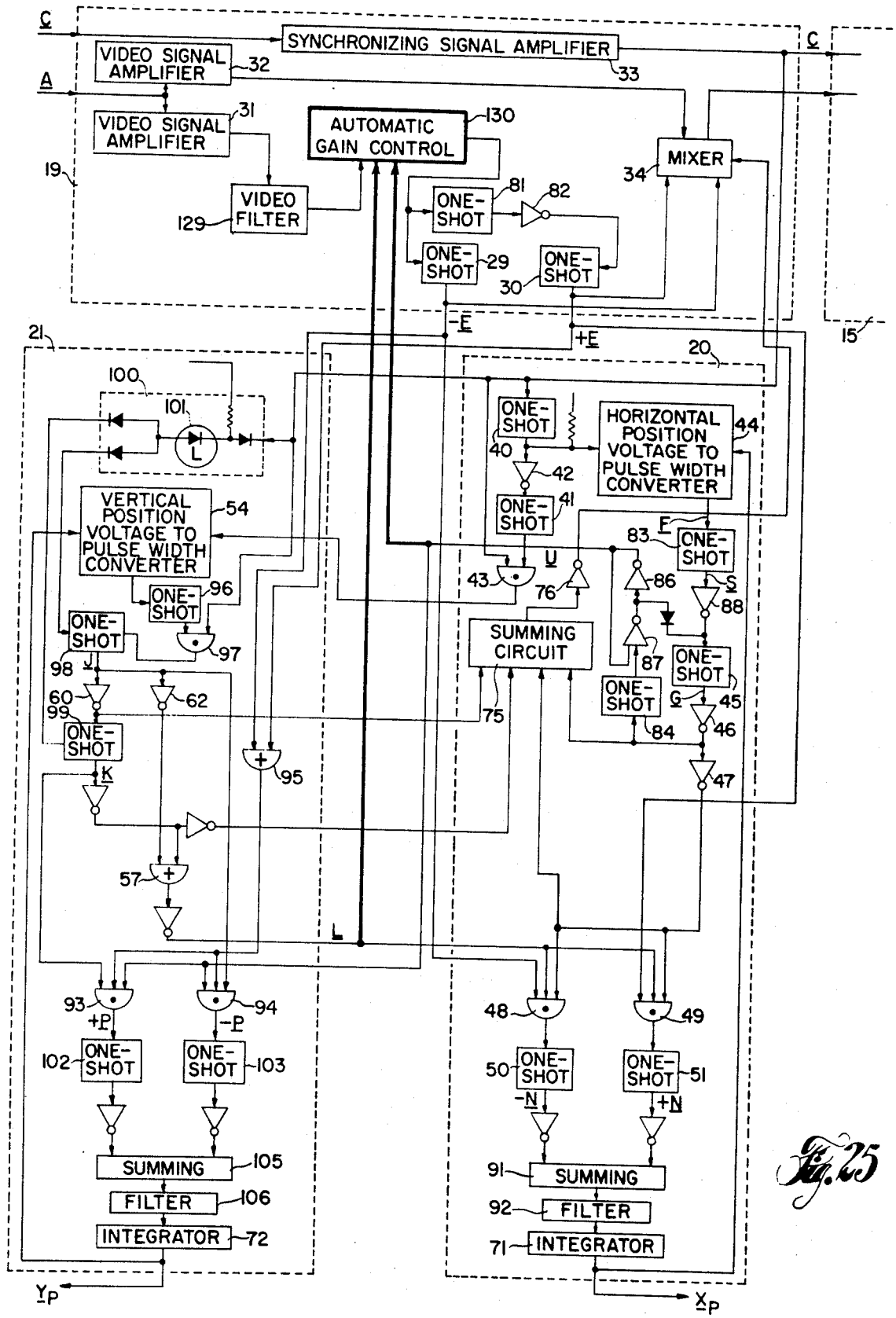

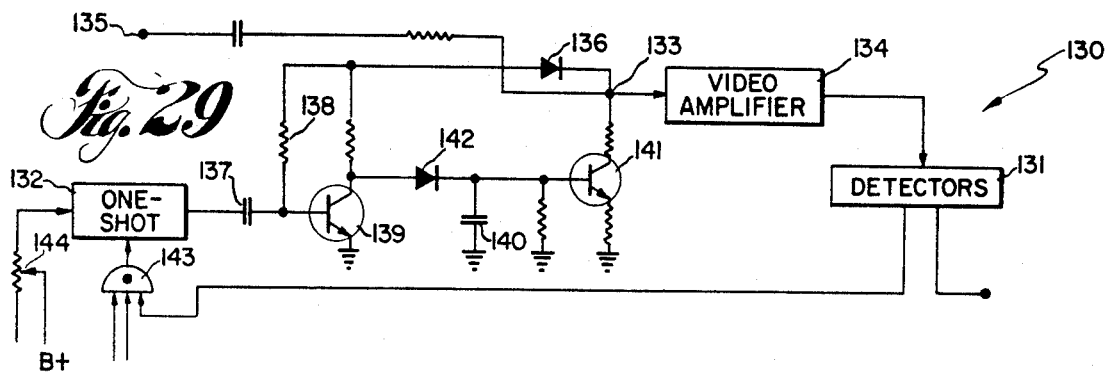
Fig. 29
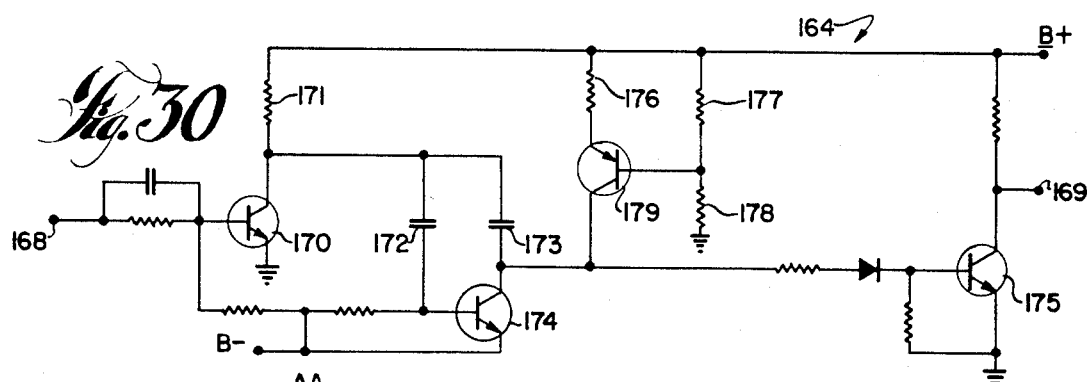
Fig. 30
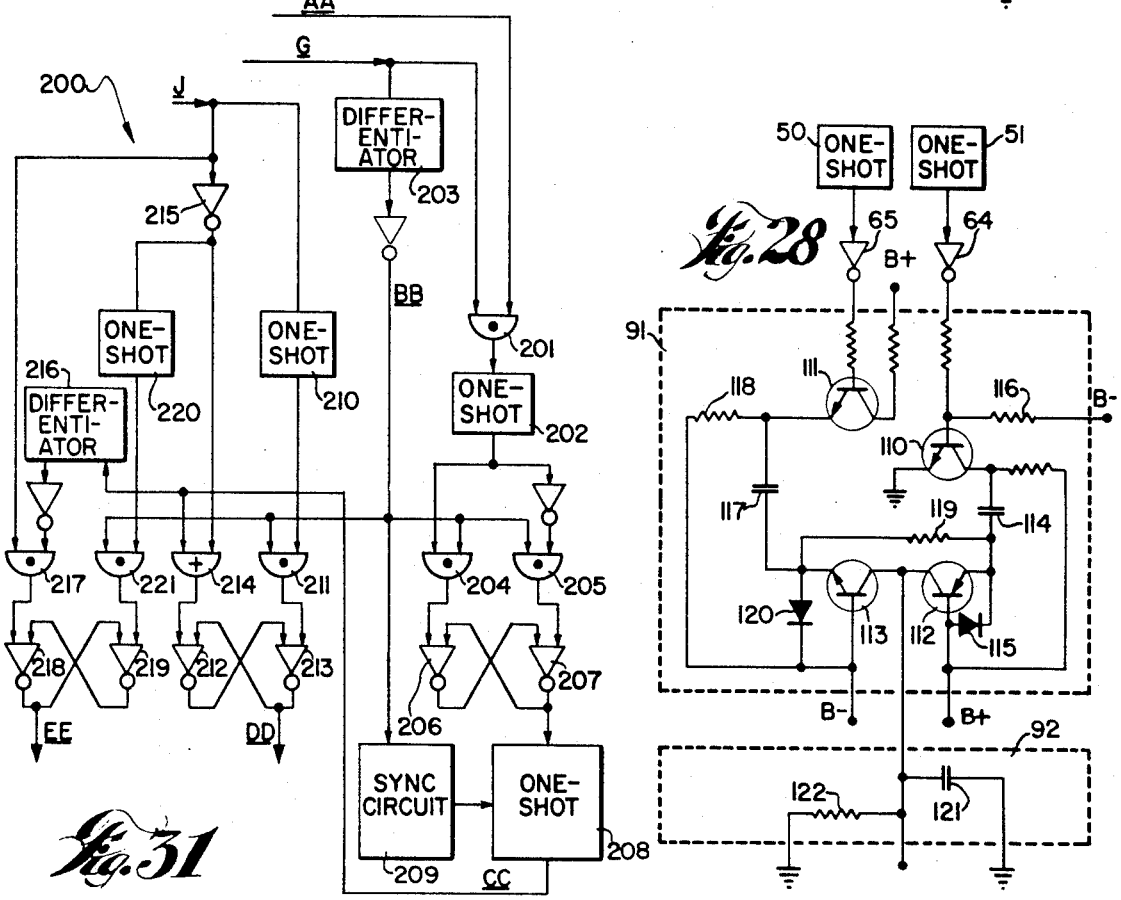
Fig. 31
Fig. 28

United States Patent Office 3,712,957
Patented Jan. 23, 1973

3,712,957
APPARATUS AND INFORMATION PROCESSING METHODS FOR A TRACKING SYSTEM TRACKER UNIT
Richard B. Kuhn, Columbus, Ohio, assignor to North American Aviation, Inc.
Filed Oct. 12, 1964, Ser. No. 406,211
Int. Cl. H04n 3/00
U.S. Cl. 178—6.8
6 Claims This invention relates generally to object tracking, and particularly concerns apparatus and information processing methods for a tracker unit that may be advantageously utilized in a tracking system to establish and maintain the viewing axis of an optical-type sensor in the tracking system in a prescribed directional relation with respect to a selected target.

An important object of this invention is to provide a tracking system tracker unit with apparatus and information processing methods that have utility in an incorporating tracking system to significantly increase the maximum tracking rates obtainable in an automatic mode of system operation, such maximum tracking rates also being more independent of the size, illumination, and contrast characteristics of the selected target than the corresponding rates obtained with known tracker units.

Another object of this invention is to provide a tracking system tracker unit with apparatus and information processing methods that have utility in an incorporating tracking system to achieve significantly increased tracking gain in the tracking loop of the unit and in the loop of the control system that is operated from the tracker unit.

A still further object of this invention is to provide a tracking system tracker unit with apparatus and information processing methods that have utility in an incorporating tracking system to realize and maintain a relatively high signal level in the development of tracking error detection signals that are based upon the duration of comparatively short coincidence-gated target marker pulses and that serve as a source for target error correction signals indicating a particularly desired direction of tracking error correction.

According to the invention, a tracker unit that is to be incorporated in a tracking system to complete a drive control between a television camera sensor unit and its driven supporting platform and that develops an analog tracking error correction signal from essentially pulsed tracking error detection signals based on the singular coincidence in different channels of target marker pulses with a tracking gate pulse, is provided with circuit means that gates an output target error detection signal which is correlated to the degree of intrusion of the singularly coincident target marker pulse into the basic tracking gate, such circuit means including linearizing means which is triggered at the start of a tracking gate and is stopped at the occurrence of the coincident marker pulse and which develops output signal whose duration in each line of television camera tracking scan is in very nearly direct proportion to the degree of intrusion of the marker pulse into the tracking gate from the appropriate edge of the tracking gate.

In the drawings:
FIGS. 1 and 2 are plan and elevational views, respectively, of representative sensor-target viewing relations which may exist in connection with the operation of a typical tracking system;

FIG. 3 is a functional block diagram of a tracking system of the type which may advantageously incorporate a tracker unit having the features of this invention;

FIG. 4 is a functional block diagram of the construction that is basic to the type of tracker unit to which this invention applies;

FIG. 5 is an elevational view of one suitable form of the monitor unit and the command controls unit shown as separate functional blocks in FIG. 3;

FIG. 6 illustrates the display relation of the reticle and tracking gates used in the embodiments of a tracker unit detailed by FIG. 9;

FIG. 7 is a combined sectional view and functional block diagram of one form of television camera unit that has been used with the embodiments of a tracker unit shown schematically in FIGS. 9 and 24 through 27;

FIG. 8 illustrates the position of target images projected on the signal electrode of the camera tube illustrated in FIG. 7 in response to various viewing relations shown in FIGS. 1 and 2;

FIG. 10 illustrates particular circuits that are preferred in constructing the video processing section shown schematically in FIG. 9;

FIG. 11 illustrates and AND gate circuit module that is preferred in constructing the embodiments of a tracker unit shown schematically in FIGS. 9 and 24 through 27;

FIG. 12 illustrates an OR gate circuit module that is preferred in constructing the embodiments of a tracker unit shown schematically in FIGS. 9 and 24 through 27;

FIG. 13 illustrates an inverter circuit module that is preferred in constructing the embodiments of a tracker unit shown schematically in FIGS. 9 and 24 through 27;

FIG. 14 illustrates a summing circuit that is preferred for use in tracker units having the features of this invention to develop an improved monitor unit display;

Figure 9:
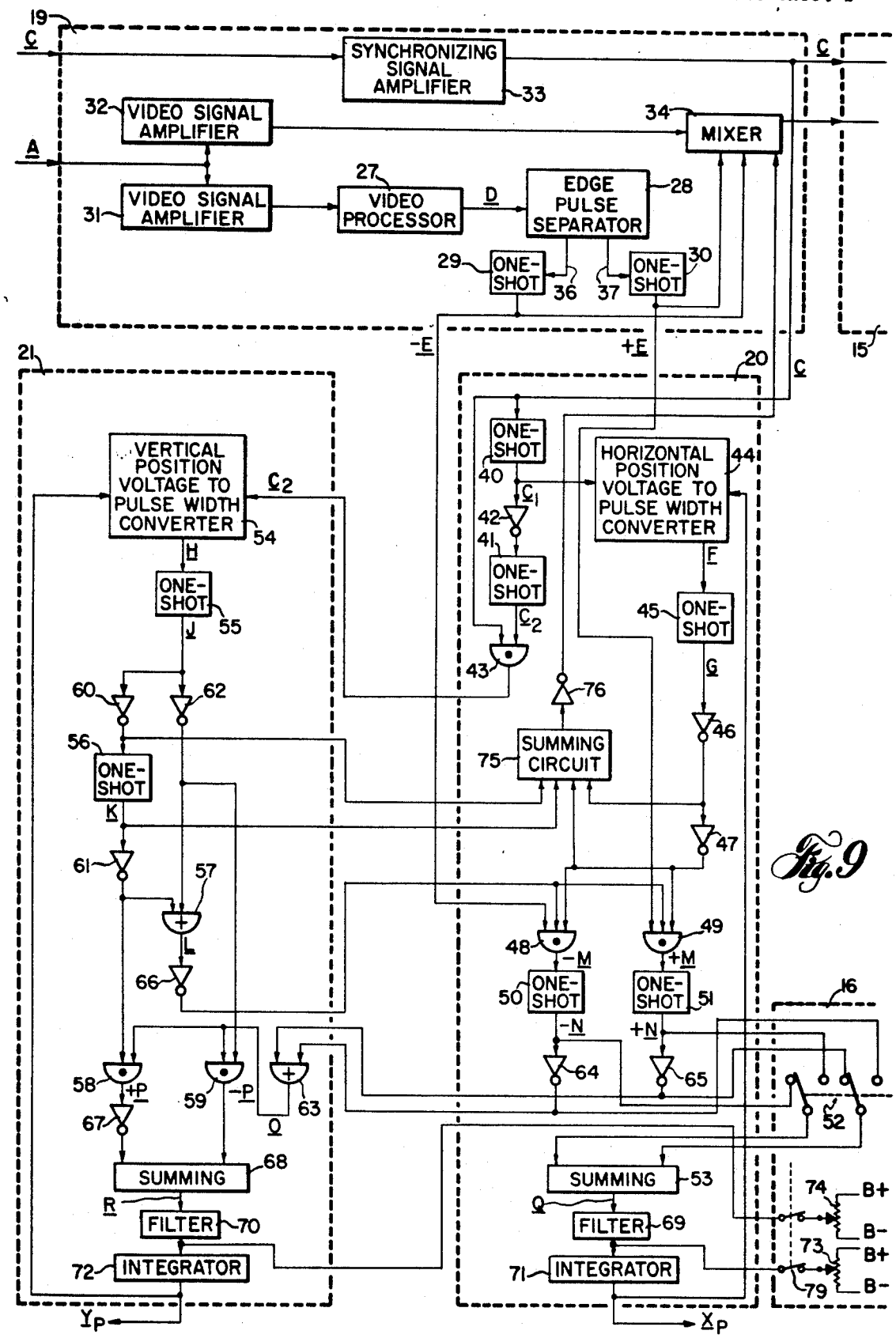
FIG. 9 is a schematic diagram of a basic embodiment of a tracker unit to which this invention has application.
Figure 26:
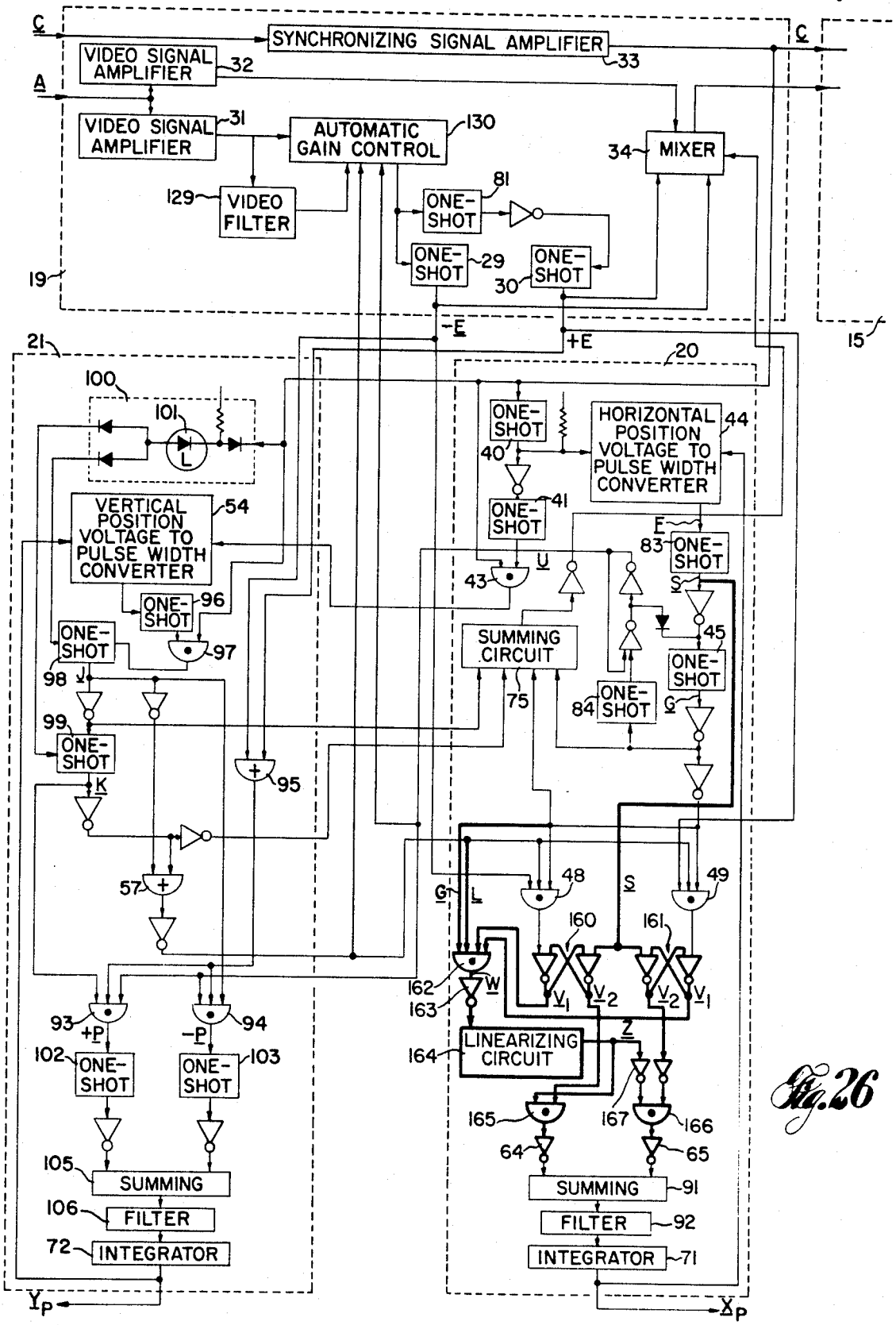
Figure 27:
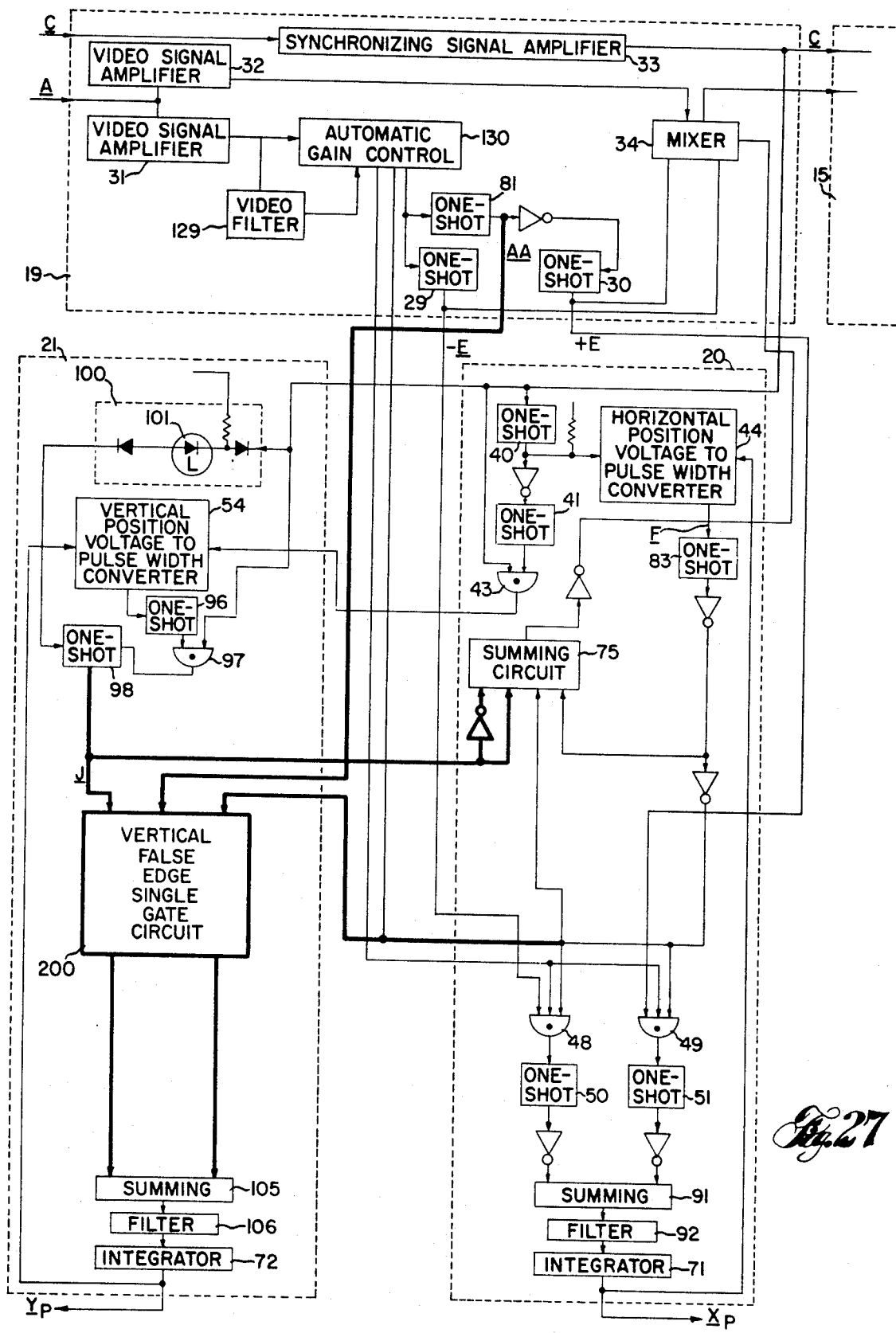
Figure 33:
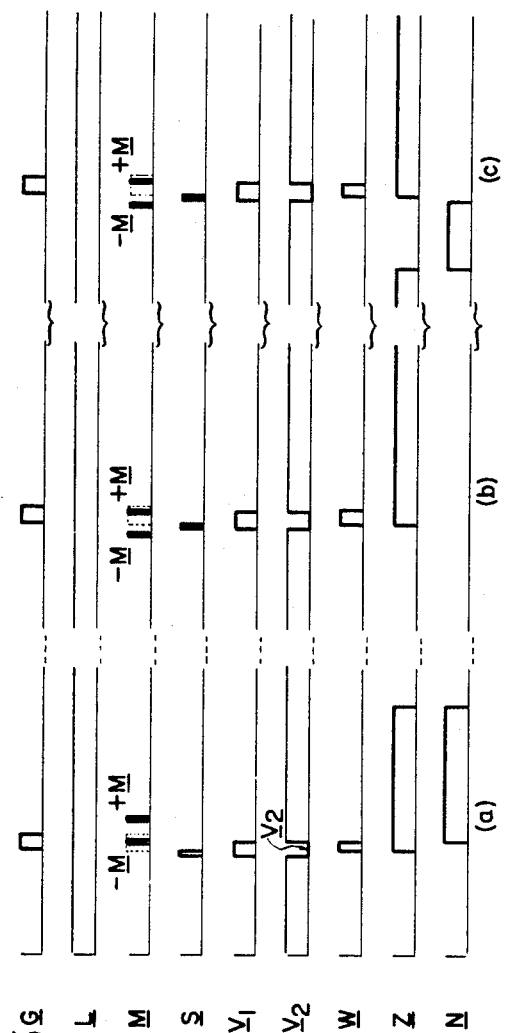
Figure 32:
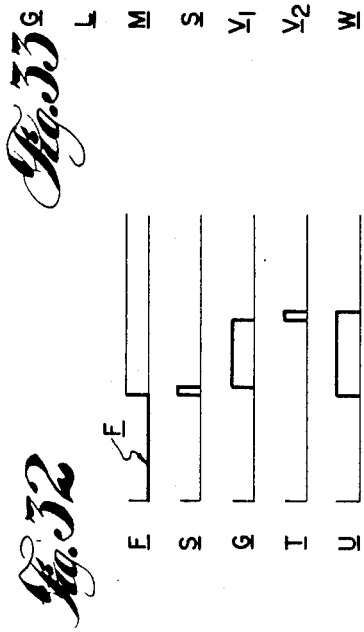
Figure 34:
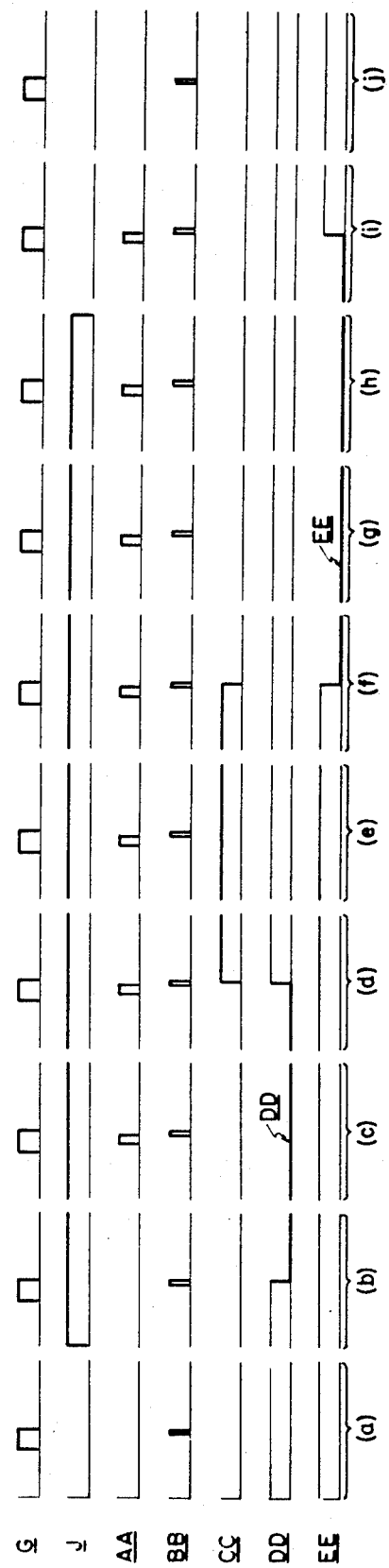

FIG. 16 details various coincidence relations that do or may exist between edge marker pulses of a selected target and the basic horizontal tracking gate pulse utilized in the FIG. 9 tracker unit embodiment;

FIGS. 17 through 23 detail key waveforms that appear at noted points within the tracker unit shown in FIG. 9 during tracking system automatic tracking operation;

FIG. 24 is a schematic diagram of a tracker unit embodiment which differs from the embodiment of FIG. 9 through the use of apparatus and method techniques relating to tracking a selected target in part by means of a false trailing edge;

FIG. 25 is a schematic diagram of a tracker unit embodiment which differs from the embodiment of FIG. 24 through the additional use of apparatus and method techniques relating to automatic gain control;

FIG. 26 is a schematic diagram of a tracker unit embodiment which differs from the embodiment of FIG. 25 through use of apparatus and method techniques relating to the utilization of tracking error signals that are proportioned in duration to the degree such tracking error signals intrude into the basic tracking gate pulse;

FIG. 27 is a schematic diagram of a tracker unit embodiment which differs from the embodiments of FIGS. 25 and 26 through use of apparatus and method techniques which relate to tracking a selected target in part by means of a vertical false edge single tracking gate pulse;

FIG. 28 details an improved summing circuit shown schematically in the tracker unit embodiment of FIG. 24;

FIG. 29 details the automatic gain control circuit shown schematically in the embodiment of a tracker unit shown in FIG. 25;

FIG. 30 details the linearizing circuit shown schematically in the tracker unit embodiment of FIG. 26;

FIG. 31 details the vertical false edge single tracking gate pulse circuit shown schematically in the tracker unit embodiment of FIG. 27;

FIG. 32 details various pulse waveforms that occur in connection with operation of the tracker unit embodiments illustrated in FIGS. 24, 25, and 26;

FIG. 33 details various pulse waveforms that occur in connection with and are peculiar to operation of the tracker unit embodiment illustrated in FIG. 26; and FIG. 34 details various pulse waveforms that occur in connection with and are peculiar to operation of the tracker unit embodiment illustrated in FIG. 27.

The type of tracking system which this invention is broadly concerned with is illustrated generally by the functional block diagram of FIG. 3. Such tracking system is referenced as 10 and is basically comprised of an optical sensor in the form of television camera unit 11, a platform and drive unit 12, and a tracker unit 13. The platform portion of unit 12 serves to support television camera 11; during operation of system 10 in its automatic tracking mode the drive portion of the unit 12 serves to move the platform and connected camera unit 11 in tracking relation to the relatively movable target $T$ positioned within the field of view designated 14. Tracker unit 13 regulates tracking movement of platform and drive unit 12 and couples that unit to television camera 11 in a feedback control relation. In addition, system 10 includes a monitor unit 15 which takes the form of a typical monochrome television picture tube and which is used to present a visual display of the general tracking problem viewed by the optical sensor and an indication of system tracking alignment. A human operator provides the link which exists between monitor unit 15 and the command controls function designated 16. The op erator is normally responsible for accomplishing such command functions as activating the system, selecting the system mode of operation (scanning or automatic tracking), selecting the target if choice is involved, and obtaining acquisition of the selected target in the system tracking reticle prior to locking-on for automatic system tracking. A power supply 17 of conventional form is typically included in system 10 to provide the preferred electrical energy for system operation.

FIG. 7 is included in the drawings to provide a schematic illustration of a type of television camera unit that has been utilized in a tracking system 10 which incorporated a tracker unit having the features of this invention. Such television camera unit is referenced generally as 22 and is basically comprised of a lens system 23, a camera tube 24, conventional video signal circuits 25, and conventional deflection and synchronizing circuits 26. For the purposes of this invention a specific form of television camera tube is not necessary; however, a vidicon-type camera tube such as is shown as component 24 of FIG. 7 has been utilized as the optical sensor portion of a tracking system having an actual embodiment of this invention. The specific vidicon-type camera tube 24 had a signal electrode photoconductive layer with a ⅜" x ½" format. The video signal circuits 25 and the deflection and synchronizing circuits 26 associated with the actually-used unit 22 operated to produce a standard one-volt television camera output video signal ($A$) and a composite horizontal and vertical synchronization signal ($C$) with a field repetition rate of 60 cycles per second. Since closed-loop circuits are normally used, it is not required that signals $A$ and $C$ be combined for transmission. Such signals, as used, did produce a standard raster comprised of 525 lines; interlacing of separate field frames can be used but is entirely optional insofar as the hereinafter-claimed invention is concerned. In addition, the video signal $A$ of the actually-used FIG. 7 arrangement included blanking pulses in correlated relation to the signal $C$ horizontal and vertical synchronization information. Equalization pulses associated with the conventional horizontal and vertical synchronization signal produced by circuits 26 are not necessary to operation of the tracking system; also it is generally preferred that the vertical synchronization pulses contained within signal $C$ be non-serrated.

FIG. 4 illustrates the functional block construction of a tracker unit which is designated 18 and which may have any one of the several specific embodiments detailed in the drawings and in the following description; such construction may be advantageously utilized as the tracker unit for tracking systems of the type disclosed generally by FIG. 3. Tracker unit 18 is essentially comprised of a video processing section 19, a horizontal logic section 20, and a vertical logic section 21. Basically, tracker unit 18 receives the output signals of television camera unit 11 (e.g., signals $A$ and $C$ of the FIG. 7 means) and by preferred apparatus (circuit means) and information processing methods derives two output signals that may conveniently be used to control azimuth and elevational movement of unit 12 during the automatic tracking mode of system operation. One such output signal ($X_p$) is basically produced by horizontal logic section 20 and is an error correction signal for automatic tracking in an azimuth sense; the other output signal ($Y_p$) is basically produced by vertical logic section 21 and is an error correction signal for automatic tracking in an elevation sense. Particular schematic arrangements and detail circuits which may be used to comprise the hereinafterdescribed embodiments of tracker unit 18 are provided in connection with FIGS. 9 and subsequent of the drawings.

Several general comments are desirable with respect to the tracker unit details in the drawings. First, some of the included circuits (e.g., video signal amplifiers 31, 32, synchronizing signal amplifier 33, mixer 34, and the like) are or can be conventional in both function and construction and are sufficiently well-known so that a functional block description is adequate for disclosure purposes; details regarding their construction are generally not shown further in the drawings. However, those circuits which are fundamental to operation of any one embodiment of a tracker unit as described herein or which generally are not clearly understood by a functional description alone, are detailed in a suitable specific form elsewhere in the drawings; see FIGS. 10 through 15 for example. Since the detailed circuits are normally completely comprehended by persons reasonably skilled in the electrical-electronic circuits art from an analysis of their schematic arrangments of components and their function, particular component electrical property values are not given. In considering the following description it should also be kept in mind that each disclosed embodiment of a tracker unit in the drawings is basically of a digital-type system that processes information in pulse form; the video signal inputs to, and the tracking error correction signal outputs from, the tracker units, however, are essentially analog in form. Generally, and unless otherwise noted, it is preferred for uniformity purposes that the various disclosed pulse circuits be triggered and fired by detected positive changes in the voltage shape of a received pulse. Accordingly, it is necessary to employ various inverter circuits (e.g., the circuit of FIG. 13) in the disclosed tracker units to key triggering actions to the leading edge of negative pulses or the trailing edge of positive pulses. Details of a satisfactory dual inverter circuit module are provided in FIG. 15. Frequent reference is made in the drawings to a circuit identified as a "one-shot" (e.g., circuit 29, 45 etc.). Such circuit is better described technically as a monostable multivibrator circuit and is detailed in its typical form in FIG. 10. In those instances where the monostable multivibrator circuit employed requires a particular operating duration characteristic, such is indicated in the description. Generally speaking, the basic coupling of individual circuits to a power supply ($B+$ or $\underline{B}$—) or to a necessary ground or reference value voltage is well-understood and is not always shown; similarly usable signal levels are not specified herein. The tracker unit embodiments of the drawings are described in operating relation to a television camera video signal wherein increasing signal voltages are caused by increasing image brightness; by polarity reversal techniques the tracker units can be made to operate equally well using or receiving a television video signal based on a negative transmission method.

Also, unless otherwise noted, the following description refers to negative and positive voltage values and such polarities have meaning with respect to a basic viewing reference. Referring to FIGS. 1, 2, and 8, targets positioned at the center of the system tracking reticle (and also at the center of the monitor or video signal raster) require zero tracking correction and produce zero position voltages and zero value correction signals. Targets viewed in or moved to the raster left or top portions establish positive voltage signals of proportionally increasing value to indicate position location or tracking correction. Conversely, targets viewed in or moved to the raster right or bottom portions are tracked using comparatively negative voltage values to inidicate position or nature of correction required. Such polarities are particularly important with respect to the output $\underline{X}_p$ and $\underline{Y}_p$ signals of the various tracker embodiments.

FIG. 9 of the drawings is provided to develop a background understanding of the typical constructional and functional details for the type of tracker unit to which the instant invention has application. Referring to the embodiment of tracker unit 18 shown in FIG. 9 specifically, the basic functions performed by video process or section 19 are accomplished by video processor circuit 27, edge pulse separator circuit 28, and one-shots 29 and 30. The signals $\underline{A}$ and $\underline{C}$ that are received from television camera unit 11 may be amplified, as by the adjunct amplifier circuits 31, 32, and 33. In addition, a mixer circuit 34 may be incorporated in video processing section 19 for use in developing information to be utilized in monitor unit 15 to display an indication of tracking system tracking alignment. The basic output signals of video processing section 19 are contrast marker pulse signals designated $+\underline{E}$ and $-\underline{E}$.

Basically, video processor circuit 27 receives an amplified video signal $\underline{A}$ and by differentiating operations detects all increases or decreases in signal voltage which occur within each horizontal line of camera field-of-view scan. By use of a suitably selected circuit time constant value, circuit 27 is made to provide positive and negative edge pulses $\underline{D}$ corresponding respectively to increases and decreases detected in the voltage of video signal $\underline{A}$. A suitable transistorized circuit for accomplishing the differentiating function and for driving the pulse transformer 35 which couples circuit 27 to circuit 28 is shown in FIG. 10 using the corresponding numeral 27 reference. The output positive and negative edge pulse $\underline{D}$ are then conducted to edge pulses separator circuit $\overline{27}$ wherein all such edge pulses are given the same polarity (positive) but are classified and conducted into separate channels 36 and 37 on the basis of their detected plus or minus voltage slope change origin. Those edge pulses which designate increasing voltage slopes are conducted by channel 36 to one-shot circuit 29 where a squaring and stretching function is accomplished. Similarly, those edge pulses which are associated with decreasing video signal voltage changes are conducted by channel 37 to one-shot circuit 30 where a similar squaring and stretching function is achieved. Suitable component arrangements for accomplishing the functions of circuits 28 through 30 are also shown in FIG. 10 by corresponding numerical designation. Circuit 28 is essentially comprised of two transistorized inverter sub-circuits with detecting diodes 38 and 39 to act as full-wave detectors. As previously mentioned, one-shot circuit 30 (detailed in one form in FIG. 10) is aptly technically described as a monostable multivibrator circuit that is fired by the leading edge of a received positive-going pulse. The construction of one-shot circuit 29 can essentially be identical to the construction of one-shot circuit 30. In an actual embodiment of the tracker unit of FIG. 9 it was found desirable that the stretched pulse durations obtained by one-shots 29 and 30 should be approximately $\frac{1}{10}$ to $\frac{1}{5}$ of the video signal horizontal scan time duration that indicates the minimum image of the selected target projected on the photoconductive layer format of camera tube 24 during automatic system tracking; the output pulse durations that were actually developed were each 0.3 microsecond. The output pulse signals of one-shots 29 and 30 are designated as $-\underline{E}$ and $+\underline{E}$, respectively in the remaining portion of this description. Such one-shot output signals are hereinafter frequently referred to as marker pulses and are the previously-referenced basic output signal pulses of video processor section 18.

Since the contrast marker pulses $-\underline{E}$ and $+\underline{E}$ locate all contrast changes in each line of camera scan, such marker pulses will include pulses that identify the leading and trailing edge time positions of the selected target that is viewed and that is to be tracked. A $+\underline{E}$ signal basically indicates a light object leading edge in a dark background or a dark object trailing edge in a light background. Conversely, a $-\underline{E}$ signal is normally related to a leading edge contrast based on change from a light background to a dark object or to a trailing edge contrast based on change from a light object to a dark background. All references to light and dark are comparative only; all references to leading and trailing edges relate to camera line scanning from left to right and to sequential left and right relative positions. In the case of a negative transmission video signal, the relations (except scanning sequence) are reversed. Also, as will be more fully explained, the tracker units of the drawings can be provided with an appropriate reversing switch that enables the incorporating system to automatically track either comparatively light (white) or dark (black) targets. In this description, details of the operation of the various tracker unit embodiments are provided in terms of positive signal tracking of an essentially dark target positioned within a comparatively light background.

It is required that the operation of horizontal and vertical logic sections 20 and 21 be synchronized with the tracking problem information sensed optically by camera unit 11 and transmitted in video signal $\underline{A}$. For this reason, tracker unit 18 of FIG. 9 is provided with a synchronization circuit that in one form is essentially comprised of one-shot circuits 40 and 41, intermediate pulse inverter circuit 42, and AND gate circuit 43. Such synchronization circuit is located in section 20 of the FIG. 9 arrangement only as a matter of convenience. One-shot circuit 40 is triggered by the leading edge of each synchronization pulse comprising composite signal $\underline{C}$ and produces a positive pulse output signal $\underline{C}_1$ having a time duration that is at least greater than the pulse width of any horizontal synchronization pulse in composite signal $\underline{C}$ but that is appreciably less than the time duration of one video signal scan-line. In an actual embodiment of the FIG. 9 arrangement, a time duration of approximately one-half scan-line (e.g., 30 microseconds) has been found suitable for output pulse signal $\underline{C}_1$. Such signal $\underline{C}_1$ is inverted by circuit 42 so that the decreasing voltage trailing edge of $\underline{C}_1$ in effect triggers one-shot circuit 41 to thereby cause circuit 41 to create a pulse signal $\underline{C}_2$ that serves a triggering function and that exists only during the absence of a horizontal synchronization pulse. A comparatively short time duration (e.g., 2 microseconds) for such output pulse signal $\underline{C}_2$ has proven adequate for at least one known tracker unit application. AND gate circuit 43 receives all pulses of composite synchronization signal $\underline{C}$ and also all trigger pulse signals $\underline{C}_2$ from one-shot circuit 41. Such trigger pulse $\underline{C}_2$ is gated through AND gate 43 only when it is time coincident with a vertical synchronization pulse. See FIG. 17. The trigger pulse gated through AND gate circuit 43 also is referenced as signal $C_2$. It should be noted that signal $C_2$ is synchronized with the vertical synchronizing pulse but has a slight time lag with respect to its leading edge; such delay is not at all detrimental to the operation of vertical logic section 21.

A horizontal tracking gate pulse signal having a controlled time position in each raster scan-line is developed in horizontal logic section 20 essentially by means of controllable monostable multivibrator circuit 44 and one-shot circuit 45. Details of a suitable construction for circuit 44, also referred to as a horizontal position voltage to pulse width converter circuit, are provided in FIG. 15 using a similar reference numeral. That circuit as will be noted, is essentially a time delay circuit that is triggered by a positive-going voltage change in the leading edge of each pulse $C_1$ generated by one-shot circuit 40; such leading edges also correspond to the leading edges of the horizontal synchronization pulses in signal $C$. The output signal $F$ of circuit 44 is a negative-going pulse whose time duration from start is proportional to the magnitude of feedback analogue voltage signal $X_p$ which is developed by section 20 as a whole. (See FIG. 18 for an illustration of three different pulse $F$ durations). Negative-going output pulse $F$ has a positive-going trailing edge that triggers or fires one-shot circuit 45. One-shot circuit 45 develops a positive output pulse $G$ which has a short time duration and which is the hereinbefore referred to basic horizontal tracking gate pulse. Such gate pulse should be somewhat longer in duration than the duration of the horizontal scan of the target image in each line of the video signal. Signal $G$ in an actual embodiment of the invention used in tracking a moving vehicle at a distance of over two miles away had a time duration of approximately 2 microseconds and was in the range of $\frac{1}{30}$ to $\frac{1}{20}$ the duration of the non-blanked part of the video signal $A$ scan-line. Inverter circuits 46 and 47, which circuits may comprise a dual inverter circuit module such as is shown in FIG. 13, are utilized to condition horizonal tracking gate pulse $G$ for use in other portions of horizontal logic section 20.

The detection of a horizontal tracking alignment error is accomplished essentially by paired but independent AND gates 48 and 49. Details regarding a typical satisfactory construction for the AND gates used in the invention are provided by FIG. 11. AND gates 48 and 49 each utilize three input terminals of the AND gate module detailed in FIG. 11. In each instance, one of the input terminals receives the positive-going horizontal tracking gate pulse signal $G$ originated in one-shot circuit 45 as fully inverted and re-inverted by circuits 46 and 47. Another input terminal of each such AND gate receives a vertical tracking gate pulse signal $L$ developed within vertical logic section 21. AND gate circuit 48, in the arrangement of FIG. 9, also receives all $-E$ edge marker pulse signals produced by one-shot 29 of video processor section 19; similar AND gate 49 is arranged to receive all of the $+E$ edge marker pulse signals developed by one-shot circuit 30 of video processor section 19. AND gate circuits 48 and 49 each function to pass the $-E$ and $+E$ edge marker pulse signals through to trigger or fire one-shot circuits 50 and 51, respectively, whenever signals $G$ and $L$ are time-coincident therewith. When the sensor of the tracking system is properly aligned with the selected target, both a $-E$ and a $+E$ marker are passed through the AND gates at the time of the gate pulse. A separate waveform designation $M$ is assigned to the passed signals resulting from the time-coincidence of horizontal and vertical tracking gates and a contrast marker pulse in AND gates 48 and 49. Such signals, which are basically tracking error detection signals, in turn are preferably extended time-wise by one-shot circuits 50 and 51 to just less than one scan-line period in duration (e.g., 60 microseconds) to form the basic horizontal tracking error pulse signals $N$ developed within tracker unit 18; such signals exist in either a $-N$ or $+N$ category although each would have an identical positive-going polarity form. One-shot circuits 50 and 51 are similar to circuit 30 but must each be provided with a fast-recovery capability (e.g., 0.5 microsecond).

As previously mentioned, the tracker units of the drawings may be provided with means which enable an incorporating tracking system to follow a selected light target on a comparatively dark background as well as dark targets positioned within a light background. This may basically be accomplished through use of the reversing switch 52 shown as a part of command controls function 16. In the switch 52 switching position shown in FIG. 9, the input terminal portions of summing circuit 53 are arranged for developing a positive voltage tracking error correction signal $X_p$ based on the coincidence gating of essentially only $+E$ marker pulse signals associated with the trailing edge of an essentially dark, relatively leftward-moving target positioned in a comparatively light background. Similarly, relatively rightward movement of the target produces a proportional negative voltage error correction signal $-X_p$.

Tracker unit 18 also detects vertical tracking errors and develops related correction signals, such being accomplished essentially within vertical logic section 21. However, the apparatus and information processing methods utilized in section 21 differ somewhat in construction and function from the comparable aspects of horizontal logic section 20. The differences essentially relate to use of a different form of tracking gate; also, position information concerning the detected target is derived from horizontal logic section 20 signals rather than from video processor section 19.

Vertical tracking gate pulse signals having a controlled vertical position within the vertical extent of the complete raster produced by television camera unit 11 are developed in vertical logic section 21 essentially by means of controllable monostable multivibrator circuit 54 and one-shot circuits 55 and 56. A suitable construction for circuit 54 corresponds to the previously-detailed FIG. 15 construction for circuit 44. Circuit 54 is also referred to as a vertical position voltage to pulse width converter circuit; it is a time delay circuit that is triggered by a positive-going voltage change in the leading edge of each pulse $C_2$ passed through AND gate circuit 43. Such leading edge identifies the existence of a vertical synchronization pulse within composite signal $C$. The output signal $H$ of circuit 54 is a negative-going pulse whose time duration from start is proportional to the voltage of signal $Y_p$ developed by section 21 as a measure of required vertical tracking error correction for the system. Output pulse $H$ has a positive-going trailing edge that fires one-shot circuit 56 only. One-shot circuit 56 develops a positive output pulse $J$ having a time duration that constitutes one portion of the basic vertical tracking gate of tracker unit 18. Signal $J$ in one actual embodiment of the invention was provided with a time duration of approximately 400 microseconds or 6 video signal scan-line periods; stated in another manner, signal $J$ in time duration was preferably in the range of $\frac{1}{60}$ to $\frac{1}{25}$ of the duration of the video signal $A$ field repetition frequency. The pulse signal $J$ output of one-shot circuit 55 is inverted by inverter circuit means 60 so that its trailing edge in effect triggers one-shot circuit 56. The output signal $K$ of circuit 56 preferably has a form and duration corresponding to the form and duration of signal $J$ produced by one-shot circuit 55. Output pulse signal $K$ then constitutes the remaining portion of the basic vertical tracking gate of tracker unit 18. Signals $J$ and $K$ are in effect combined by OR gate 57 to form the basic vertical tracking gate pulse signal $L$ that is required in horizontal logic section 20 on a coincidence basis to gate $-E$ and +$\underline{E}$ contrast marker pulses through gates 48 and 49. Inverter circuits 61 and 62, like circuit 60, are provided in section 21 to develop the proper polarity for the indicated pulses at the indicated stages of signal processing. In this respect, it should be noted that OR gate 57 functions to gate negative pulses; the output of that gate in turn must be inverted, as by inverter circuit 66, to place the vertical tracking gate pulse in proper polarity condition for gates 48 and 49.

The detection of a vertical tracking alignment error is accomplished in vertical logic section 21 essentially by paired but independent AND gates 58 and 59. As in the case of AND gates 48 and 49, such vertical section gates may use the construction detailed in FIG. 11; however, AND gates 58 and 59 each utilize only two input terminals. In each instance, one of the input terminals receives a horizontal tracking error signal $\underline{O}$ from OR gate 63; such signal is essentially made up of $-\underline{N}$ or $+\underline{N}$ horizontal tracking error signals as inverted by inverter circuits 64 and 65. The other input terminal of AND gate 58 receives the vertical tracking gate signal $\underline{K}$ developed within one-shot circuit 56 after appropriate inversion by circuit 61. AND gate 59, on the other hand, has its other input terminal arranged to receive the $\underline{J}$ pulse signal portion of the basic vertical tracking gate after it has been inverted by inverter circuit 62. Whenever an inverted $-\underline{N}$ or $+\underline{N}$ horizontal tracking error signal is received at AND gates 58 and 59 in time-coincident relation to either of vertical tracking gate pulse signals $\underline{J}$ or $\underline{K}$, such stretched horizontal tracking error signals serve to form corresponding vertical tracking error signals that are passed through (and in the case of $-\underline{P}$ signals after inversion by circuit 67) to summing circuit 68. A separate waveform designation $\underline{P}$ is assigned to the passed signals resulting from the time-coincidence of a vertical tracking gate and a horizontal tracking error detection signal. Those tracking error detection signals which are associated with the gating action of one-shot circuit 55 only are given a $-\underline{P}$ designation; those vertical tracking error detection signals which are developed through time-coincidence with the vertical tracking gate pulse established by one-shot circuit 56 are designated as $+\underline{P}$. Time-wise in each raster, $+\underline{P}$ pulses will normally occur, if there is no vertical tracking error, after the developed $-\underline{P}$ pulses.

The remaining portions of logic section 20 (and 21) are each comprised of a summing circuit 53 (or 68), a filter circuit 69 (or 70), and an integrator circuit 71 (or 72), as shown in FIG. 9. Such additional circuits essentially function to develop appropriate tracking error correction signals ($\underline{X}_p$ or $\underline{Y}_p$) for controlling movement of the tracking system sensor in tracking relation to moving or movable target $\underline{T}$. Such tracking error signals, which are basically in DC voltage analog form, also are provided as feedback signal inputs to controllable monostable multivibrator circuits 44 and 54. Detailed construction of particular circuits for carrying out the functions of circuits 53 and 69 through 72 are provided in FIG. 15. Since the constructions of circuits 68, 70 and 72 preferably correspond to the constructions of circuits 63, 69, and 71, respectively, duplicate details are not provided in the drawings.

Figure 15:
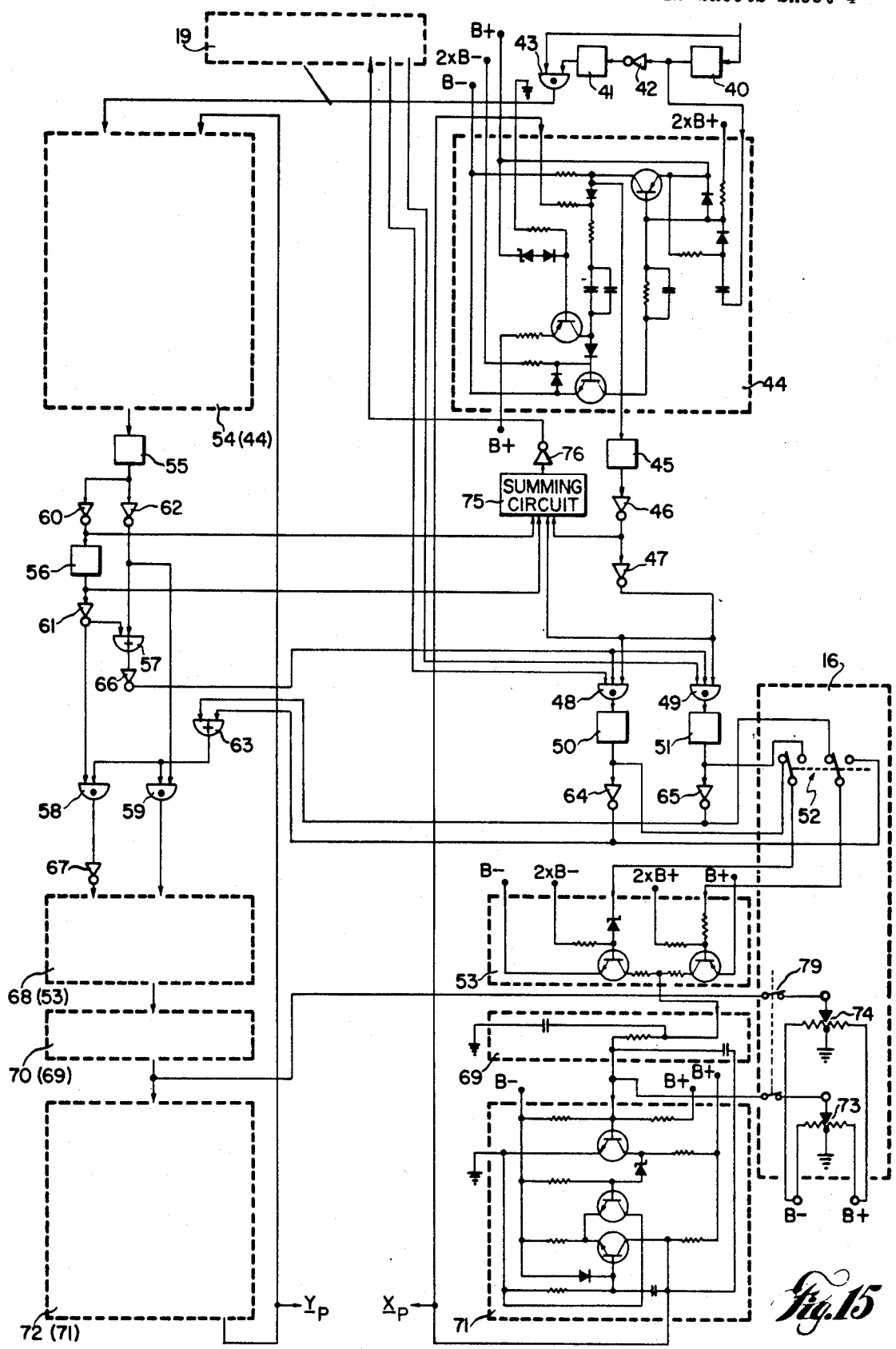
FIG. 15 illustrates particular circuits that are preferred in constructing the horizontal and vertical logic sections shown schematically in FIG. 9.

Summing circuit 53 of FIG. 15 functions to add the $-\underline{N}$ and inverted $+\underline{N}$ tracking error pulses which appear at any instant within horizontal logic section 20 during operation of the tracker unit. The output signal of summing circuit 53 is designated $\underline{Q}$; in the case of circuit 68, the output signal is identified by the reference letter $\underline{R}$. Normally, the $-\underline{N}$ and the $+\underline{N}$ signals which are introduced into summing circuit 53 are largely coincident during each scan-line period of tracking alignment and during tracking the difference seen by circuits 69 and 71 is essentially zero. However, when there is tracking misalignment a sequence of $-\underline{N}$ or $+\underline{N}$ pulses are present and do cause error correction signals to be developed in the subsequent portion of the tracker unit. (See FIG. 23 for specific examples.) In the case of summing circuit 68, however, the input tracking error signals $-\underline{P}$ and inverted $+\underline{P}$ are entirely non-coincident. This is because vertical tracking gate pulses $\underline{J}$ and $\underline{K}$ are derived sequentially.

Filter circuits 69 and 70, details for which are given in FIG 15, are provided in the invention so as to essentially average out or smooth the pulsed output signals $\underline{Q}$ and $\underline{R}$ so as to be in usable form for integrator circuits 71 and 72. Circuits 69 and 70 are substantially identical in function but differ in that filter circuit 70 must essentially respond to $\underline{R}$ signals which normally occur in sequential groupings. Up to six successive individual pulses may comprise each such grouping in the case of specific one-shot circuits 55 and 56 each having a 400 microsecond output. Integrator circuits 71 and 72 respond essentially to the output of circuits 53 and 68; their outputs are inverted relative to the polarity of the inputs to the summing circuits 53 and 68. See FIGS. 22 and 23.

FIG. 15 (and also FIG. 9) provides schematic details of certain manually-operated controls that may be desirably incorporated in command control function 16 to facilitate operation of tracker unit 18. Such specific command controls include reversing switch 52, acquisition potentiometer means 73 and 74, and selection switch 79. A basic on-off switch is generally desirable but is not shown in the drawings. As previously explained, reversing switch 52 is provided so as to improve the capability of tracker unit 18 to follow essentially light targets existing on a comparatively dark background as well as the indicated dark target positioned on a light background. Potentiometer means 73 and 74 may be operated relative to an intermediate zero potential or ground voltage value to either of the indicated maximum $\underline{B}-$ and $\underline{B}+$ supply voltages. In the specific embodiment of the invention shown in FIGS. 1 through 15, a zero output voltage associated with signal $\underline{X}_p$ positions the horizontal tracking gate pulse at the horizontal center of the television camera video signal scan-line. $\underline{B}+$ ($+\underline{X}_p$) values position the gate toward the left extreme (FIG. 5) of the resulting raster; basically, the degree of displacement from the center is directly proportional to the magnitude of the developed positioning voltage value. Similarly, potentiometer means 73 may be manually positioned to $\underline{B}-$ ($\underline{X}_p$) voltage values to displace the horizontal tracking gate pulse proportionately to the right (FIG. 5) of the raster horizontal center position. In a similar manner, potentiometer means 74 may be moved manually to obtain $\underline{B}-$ and $\underline{B}+$ voltage values to displace the vertical tracking gate pulses $\underline{J}$ and $\underline{K}$ in their natural time sequence below or above, respectively, the vertical center of the video signal output raster. Scan-track switch 79 must be closed as shown in the drawings to facilitate initial target acquisition for automatic tracking; once acquisition of the target is obtained, switch 79 may be opened to make potentiometer means 73 and 74 inoperative and to place movement of the tracking system optical sensor and tracking gate pulses under the complete locked-on control of tracking error correction signals $\underline{X}_p$ and $\underline{Y}_p$ produced by logic sections 20 and 21.

The television picture tube element normally included in monitor unit 15 basically receives video signal A and synchronization signal $\underline{C}$ for developing a conventional visual presentation of the general tracking problem to be observed by the system operator. The visual display presented thereby, however, may be significantly enhanced by other features of this invention. Such enhancement is accomplished by means of summing circuit 75 and by means of the $-\underline{E}$ and $+\underline{E}$ edge marker pulse signals developed in circuits 29 and 30. Summing circuit 75, details for which are provided in FIG. 14, develops so-called cross-hair pulse information for presentation on the screen of monitor unit 15. Such cross-hair pulse information develops the paired horizontal cross-hair lines 77 and the paired vertical cross-hair lines 78 shown in FIG. 5. The rectangular area defined by and located within the intersection of cross-hair lines 77 and 78 comprise the tracker unit 18 reticle. For tracking with the FIG. 9 unit, the selected target is located entirely within the reticle for target acquisition or lock-on purposes. See FIG. 5 and the target display reference $T_0$. FIG. 6 shows the makeup of that reticle in terms of the duration of tracking gate pulses $G$, $J$, and $K$. The cross-hair pulse information is developed in circuit 75 essentially by differentiator sub-circuits that detect negative-going voltage changes in the leading and trailing edges of the appropriate gate pulses. More specifically, one input terminal of circuit 75 receives signal $G$ after a single inversion and detects its leading edge; another input terminal of circuit 75 receives pulse $G$ after a double inversion by circuits 46 and 47 and detects its negative-going trailing edge. Such detected edges comprise, after inversion and mixing, the cross-hair pulses that form dark cross-hair lines 78. In a similar manner, signals $J$ (after inversion by circuit 60) and $K$ are conducted to summing circuit 75 where their leading and trailing edges, respectively, are detected. The differentiated detected leading and trailing edges of the vertical gate pulses are afterwards introduced into monitor unit 15 to comprise horizontal cross-hairs 77.

This display developed for monitor unit 15 may also be enhanced by appropriate use of edge marker pulses $-E$ and $+E$ as follows. Mixer circuit 34 can function to gate those edge (contrast change) marker pulses which are time-coincident with tracking gate edge pulses developed in summing circuit 75 and amplify such passed pulses for presentation in the picture tube of monitor unit 15. The so-gated and so-amplified marker pulses give a display indication to the operator that tracker unit 18 is actually following the selected and displayed target contained within video signal $A$.

FIG. 16 is provided in the drawings to illustrate various coincidence relations that do (or may) exist as between edge marker pulses associated with a selected target and the basic horizontal tracking gate pulse. Preferably, the $-E$ and $+E$ edge marker pulses associated with the leading and trailing edges of a selected target are positioned entirely within the horizontal tracking gate pulse as shown in FIG. 16(a). If the target is moved to the left relative to the viewing axis of the system optical sensor as in the case of a movement toward position $T_2$ from aligned position $T_0$ of FIGS. 1 through 3, the $-E$ leading edge pulse will become coincident with the leading edge of the horizontal tracking gate pulse (FIG. 16(b)). Inasmuch as coincidence is maintained as between the tracking gate pulse and at least a part of each target edge marker pulse, such being a non-singularly coincident pulse relation, no tracking alignment error is detected. Complete absence of but one of the two target edge marker pulses from within the tracking gate (FIG. 16(c)), i.e., a singularly coincident pulse relation, causes development of a tracking error signal based on the coincidence of the remaining interiorly-positioned target trailing edge marker pulse. Such error correction signal, as processed through summing circuit 53, filter circuit 69, and integrator circuit 71, in effect causes the horizontal gate to be repelled away from the coincident singular target edge marker pulse and toward the "escaped" target opposite edge (target interior) marker pulse, i.e., toward a non-singularly coincident pulse relation. Relative movement between the target and the horizontal tracking gate in an opposite direction will cause tracking gate conditions corresponding to the relations shown in FIGS. 16(d) and 16(e). Sufficient rightward movement of the target will ultimately result in only the target leading edge being coincident with the horizontal tracking gate pulse so as to cause an error signal indicating a need for tracking correction. See FIG. 16(e). FIG. 16(f) illustrates the situation which occurs when the selected target in effect outruns the established horizontal tracking gate. This situation is commonly referred to as an "unlock" situation; it occurs whenever the relative movement between the selected target and the optical sensor occurs at a rate that exceeds the maximum obtainable tracker unit tracking rate. FIG. 16(g) illustrates the minimum target edge marker pulse separation which generally may be permitted with respect to successful actual embodiment of the tracker units described herein. The improved tracking rates which are obtained with the disclosed embodiment result chiefly from those wherein the distance between the target edges (edge marker pulses leading edges) is not less than $\frac{1}{10}$ the duration of the horizontal tracking gate. The net effect of closing movement of the target relative to the tracker or vice versa, is illustrated by FIG. 16(h). As shown therein, the spacing between the target edge marker may increase relative to its projection on the television camera tube sensor format so that the edge marker pulses may become coincident with the gate pulse edges. Whenever the separation between the selected target marker pulses exceeds one gate width, there is a recognized possibility of losing tracking control over the selected target.

FIG. 17 illustrates the various signals which occur within video processor section 19 and the syncronization circuit included as a matter of convenience within horizontal logic section 20. The signals of the first line within FIG. 17 detail typical positive transmission video signals produced by camera unit 11 during scanning of a general tracking problem. The first (a) and second-last (e) line portions of signal $A$ in FIG. 17 show a representative background situation; the second (b) through fourth (d) line portions show the effect of a dark target $T$ positioned against a comparatively light background. The last line portion (f) shows the presence of a vertical blanking pulse; horizontal blanking pulses occur in each of the other line portions at the trailing region. The horizontal and vertical synchronizing pulses produced by television camera unit 11 appear on the line designated $C$. Also superimposed on that line are the pulses $C_1$ and $C_2$ used to logically determine the existence of a vertical synchronization pulse in the composite synchronization signal. The last line of FIG. 17 shows the waveform $H$ which occurs as the result of detecting a vertical synchronizing pulse in the composite synchronizing signal. Marker pulses detecting each contrast change occurring within a scan-line are designated $D$. By appropriate manual or automatic sensitivity control, the number and degree of contrast change detected within a typical scan-line may be varied. A variable amplification function carried out within video amplifier section 31 may be adequate for this purpose. The resulting rectified and squared edge marker pulses are appropriately designated $+E$ and $-E$ in the signal line designated $E$.

FIG. 18 illustrates the effect of the logic section output signal $X_p$ on the positioning of the horizontal tracking gate pulse within each video scan-line. The first and third line portions indicate situations wherein the gate pulse has been in effect moved significantly to the left or significantly to the right relative to the television picture tube raster centerlines. In the case of the first line portion (a) of FIG. 18, a large $+X_p$ signal will move marker pulse $G$ leftward a proportional degree. The second line portion (b) of FIG. 18 shows the positioning of the gate pulse $G$ at the horizontal center of the television picture tube raster by means of delay signal $F$ produced by a zero feedback input voltage. The zero feedback voltage is used to reference operation of the tracker unit to the center of the television raster. FIG. 18(c) illustrates a situation wherein a high negative voltage horizontal tracking error correction signal is utilized to move the horizontal tracking gate $G$ toward the extreme right portion of the television camera raster.

FIG. 19 illustrates the relations which exist as between vertical tracking signal $L$ and its variably-positioned and sequentially-fired gate pulses $J$ and $K$. It should be noted that the leading edge of gate pulse $\underline{J}$ is coincident with the trailing edge of variable duration positioning pulse $\underline{H}$. Similarly, the leading edge of gate pulse $\underline{K}$ is coincident with the trailing edge of gate pulse $\underline{J}$. Pulse signal $\underline{L}$ is the inverted composite of pulses $\underline{J}$ and $\underline{K}$ and is commonly referred to as the vertical gate pulse that is conducted to horizontal logic section 20 for use in gating edge marker pulses that are coincident therewith and with the basic horizontal tracking gate pulse. As previously commented, the trailing edge of pulse signal $\underline{H}$ is positioned time-wise from the start of each vertical scan in proportion to the magnitude of the $+\underline{Y}_p$ or $-\underline{Y}_p$ error correction signal that is the output of vertical logic section 21. In the arrangements shown in the drawings, if the $\underline{Y}_p$ signal is of zero voltage value, the trailing edge of pulse $\underline{H}$ is normally positioned just slightly above the center of the raster vertical centerline.

FIG. 20 illustrates typical coincidence relations that exist as between $-\underline{E}$ and $+\underline{E}$ target edge marker pulses and horizontal gate pulse $\underline{G}$ during automatic operation of the tracking system. As noted therein (FIG. 20(c), for instance), whenever a $+\underline{E}$ pulse only is coincident with a horizontal tracking gate pulse $\underline{G}$, the resulting passed pulse ($+\underline{M}$) by triggering one-shot circuit 51 produces a $+\underline{N}$ pulse of approximately one-line duration; no $-\underline{M}$ or $-\underline{N}$ pulses are developed in the same scan-line. Although not shown, in those instances in which a $-\underline{E}$ pulse only is coincident with horizontal tracking gate pulse $\underline{G}$ (as during extreme rightward movement of the selected target relative to the sensor viewing axis), a $-\underline{N}$ tracking error detection pulse is generated within any one video signal horizontal scan-line. Signal $\underline{O}$ is produced by OR gating the developed $\underline{N}$ tracking error detection pulses through OR gate circuit 63 in tandem. During proper tracking system sensor alignment with the selected target both $-\underline{N}$ and $+\underline{N}$ tracking error detection pulses will be provided within each video signal scan-line. However, such pulses in effect cancel each other in summing circuit 53 to indicate that no tracking horizontal correction is in fact required. In those tracking situations wherein alignment correction is required, a grouping of several consecutive $-\underline{N}$ or $+\underline{N}$ pulses will generally exist within an individual field scan. Assuming that the duration of vertical gate pulses $\underline{J}$ and $\underline{K}$ are each approximately six (6) scan-lines and assuming that the target essentially extends vertically through the duration of the vertical tracking gates, the resulting grouping may consist of as many as twelve (12) consecutive tracking error detection pulses.

FIG. 21 shows generally similar tracking error detection pulse waveforms $+\underline{P}$ and $-\underline{P}$ developed within vertical logic section 21. It should be noted that each part of tracking error detection pulse signal $\underline{O}$ is essentially passed through either gate 58 or gate 59 if coincident with either a vertical tracking gate pulse $\underline{K}$ or $\underline{J}$, respectively. During proper alignment of the tracking system sensor viewing axis with the selected target in the automatic mode of system operation, $-\underline{P}$ and $+\underline{P}$ pulses will occur in sequential groupings of individual pulses. Assuming that the time duration of the gates produced by one-shot circuits 55 and 56 are each approximately six (6) lines and assuming that the tracker unit is detecting one or both of the target edges so as to develop signal $\underline{O}$ in each scan-line, as many as twelve (12) successive $\underline{P}$ pulses in two different groupings may occur.

FIG. 22 shows the typical relations which exist as between $-\underline{N}$ and inverted $+\underline{N}$ pulses in the FIG. 9 arrangement and within an individual scan-line. In those instances where both target edge marker pulses are within the basic horizontal tracking gate the resulting tracking error detection signals are in effect cancelled by appropriate addition in summing circuit 53 and do not develop a tracking error correction signal $\underline{X}_p$; however, when a single edge marker pulse is coincident with the basic horizontal tracking gate pulse, an unopposed $\underline{N}$ pulse is developed and serves to activate the subsequent circuits 53, 69, and 71 to produce a usable correction signal of proper polarity and magnitude. Filter circuit 69 essentially serves to smooth out the differences of the $-\underline{N}$ and $+\underline{N}$ signals in any one scan-line to desirable levels; through proper design for integrator circuit 71 and in certain tracker unit applications it is possible to eliminate the need for filter circuit 69.

FIG. 23 details the typical error correction signals $\underline{X}_p$ that are developed from intermediate signals $\underline{Q}$ in response to tracking error detection pulses indicating a system requirement for re-alignment of the sensor viewing axis relative to the selected target. The time periods represented by the FIG. 23 (a) and (b) combination and by the FIG. 23(c) and (d) combination are each essentially one vertical scan-time or a total of approximately 525 individual scan-lines in duration. It should be noted from FIG. 23 that a grouping of $-\underline{N}$ pulses indicating that a relatively rightward-moving target leading edge is coincident with the basic horizontal tracking gate produces negative-going output signals $\underline{Q}$ and $\underline{X}_p$ that drive the tracking gate rightwardly away from the coincident target edge and toward the target interior and opposite or trailing edge. Similarly, a grouping of inverted $+\underline{N}$ pulses (FIG. 23(c)) indicating that a relatively leftward-moving target trailing edge is coincident with the basic horizontal tracking gate produces positive-going output signals $\underline{Q}$ and $\underline{X}_p$ that drive the tracking gate leftwardly away from the coincident target edge and toward the target interior and opposite or leading edge. This principle of operation prevails in other embodiments of tracker unit 18 even though the basic horizontal tracking gate pulse be modified so that the gate falls entirely within or intermediate the target edges rather than the target edges normally being positioned entirely within the limits of the basic horizontal tracking gate.

FIG. 24 of the drawings is provided to develop further background understanding of the typical construction and function details for the type of tracker unit construction and function to which the instant invention has application; more specifically, the tracker unit arrangement of FIG. 26 having a preferred embodiment of this invention utilizes the "false trailing edge" marker pulses developed by the FIG. 24 arrangement. In at least some known tracking system applications it is desirable and even necessary to improve overall performance by incorporating a tracker unit embodiment that minimizes the likelihood of losing vertical tracking lock-on during system automatic tracking operation and that minimizes the random drifting of the basic horizontal tracking gate when the gate is small in comparison to the horizontal separation of the tracked target's essentially vertical edges. These characteristics are generally particularly desirable in applications wherein the tracked target is comparatively large in size. An arrangement for accomplishing these objectives is shown in the schematic tracker unit embodiment of FIG. 24. In that illustration, the basic tracker unit features that are common to the FIG. 9 embodiment are shown in compartively light lines. Those features which are incorporated by way of addition to the unit to obtain the improved operating characteristics are illustrated in comparatively heavy lines. Similarly, those construction features which may be deleted from the FIG. 9 arrangement as being undesirable or redundant are illustrated by cross-hatched lines. Also, it is to be noted at this point that the arrangement of FIG. 24 is best suited to use in tracking systems having a television camera sensor unit that produces a standard system video output signal. Normally $-\underline{E}$ marker pulses are associated with decreasing video signal voltages including the leading edge of a selected comparatively dark target.

Video processor section 19 of the FIG. 24 embodiment differs in construction from the FIG. 9 arrangement essentially in the use of a switch 80 that may be selectively operated to cut out one output portion of edge pulse separator circuit 28 and to thereby activate one-shot circuit 81 and inverter circuit 82. Such additional components to section 19 are provided to generate a so-called "false trailing edge" marker pulse for each contrast change that is detected by video processor circuit 27. Since one-shot circuit 81 is to be triggered by each contrast change whether negative-going or positive-going to produce an artificial and delayed marker pulse at one-shot circuit 30, the separation function of edge pulse separator circuit 28 becomes totally unnecessary to satisfactory operation of the tracker unit. Accordingly, channel 37 is omitted from section 19 by operation of switch 80. In selecting the individual components for one-shot circuit 81, it is preferred that the circuit output signal have a time duration just a little longer than the duration of the basic horizontal tracking gate pulse developed by one-shot circuit 45. Thus, in one actual embodiment of the FIG. 24 tracker unit arrangement, one-shot circuit 81 was provided with a 1.5 microsecond width in relation to a 1.0 microsecond basic horizontal tracking gate pulse width. The output signals of the FIG. 24 version of video processing section 19 are, as in the case of the Fig. 9 arrangement, designated as $-\underline{E}$ and $+\underline{E}$ contrast marker pulses. The $-\underline{E}$ pulse, however, is normally generated with each negative-going voltage contrast change detected by video processor circuit 27 and therefore is basically associated with the leading edge of an essentially dark target positioned in a comparatively light background.

FIG. 26 of the drawings discloses a tracker unit embodiment having the instant invention incorporated therein. In those instances where in it is desired that a higher tracking loop gain be provided in a tracking system of the type schematically disclosed in FIG. 3, it is preferred that the included tracker unit 18 embodiment for the system utilize tracking error detection signals of the variable duration. More specifically, it has been discovered that improved system performance can be obtained if the developed tracking error detection signals each have a time duration that is proportional to the degree that the coincident target edge marker pulse (real or false) intrudes into the basic horizontal tracking gate pulse $\underline{G}$ from its adjacent edge. Such variable tracking error detection pulses do not have the "nearly one-line duration" of the $\underline{N}$ pulses otherwise developed by one-shot circuits 50 and 51. An arrangement for accomplishing such objective is disclosed schematically in FIG. 26 and in detail in FIG. 30.

In the FIG. 26 arrangement, the $\underline{S}$ horizontal tracking gate extension signal developed by one-shot circuit 83 is utilized to set tandem flip-flop circuits designated 160 and 161 in each signal scan-line just before each basic horizontal tracking gate pulse $\underline{G}$. Such flip-flop circuits may each be constructed of the dual inverter module detailed in FIG. 13 and normally provide positive output signals to AND gate 162 and zero (or comparatively negative) output signals to AND gates 165 and 166 when set. However, when an error detection pulse $\underline{M}$ is gated through AND gate 48 or AND gate 49, the receiving flip-flop circuit is triggered to a reversed polarity output condition. (Signal $\underline{S}$ will serve to reset either triggered flip-flop circuit 160 or 161 to its basic output condition just before the next basic horizontal tracking gate pulse $\underline{G}$.) AND gate 162 provides a continuous zero (comparatively negative) pulse output to inverter 163 until such time as received $\underline{G}$ and $\underline{L}$ basic horizontal and vertical tracking gate pulses and received pulses from both of the set flip-flop circuits are coincident. At such time the received pulses gate a positive pulse signal $\underline{W}$ to inverter 163; the inverted (negative) pulse output transmitted from circuit 163 to 164 then starts the proportioning function to be accomplished in linearizing circuit 164. A subsequent return of a flip-flop circuit zero (comparatively negative) signal to AND gate 162, as by the triggering of either of flip-flop circuits 160 and 161 by a gated $\underline{M}$ tracking error detection pulse, restores the zero output of AND gate 162, introduces a positive input to circuit 164, and initiates a termination action for the linearizing accomplishment of circuit 164. The triggered flip-flop circuit continues to produce a negative output until reset by pulse $\underline{S}$. Linearizing circuit 164 functions to derive an output signal $\underline{Z}$ that is introduced directly into AND gate 165 and indirectly (after inversion by inverter circuit 167) into AND gate 166. Such output signal has a time duration that is related to and an indication of the linear intrusion of any coincident tracking error detection pulse $\underline{M}$ into gate pulse $\underline{G}$; basically, the resistor and capacitor values for the components of circuit 164 are selected to that the output signal $\underline{Z}$ will have a duration of very near one scan-line period when the coincident marker or error detection pulse intrudes into the basic horizontal tracking gate pulse $\underline{G}$ approximately the width of such gate pulse. The key waveforms of the FIG. 26 arrangement are shown in FIG. 33. Details of a preferred construction for circuit 164 are provided in FIG. 30. The input terminal to circuit 164 is designated 168 and the output terminal 169.

As above-mentioned, between successive time-coincident basic horizontal tracking gate pulses, the input signal to circuit 164 is positive and transistor component 170 is "on," thus drawing current through resistor 171. When the basic horizontal tracking gate pulse $\underline{G}$ and the basic vertical tracking gate pulse $\underline{L}$ along with the output pulse of a triggered flip-flop circuit appear at AND gate 162, transistor component 170 will be turned "off" by the resulting negative input to terminal 168 to thereby start the linearizing function in circuit 164. The current through resistor 171 now serves as a charging current for capacitors 172 and 173. The current through capacitor 172 serves as base current for transistor component 174; most of the current flowing from resistor 171, however, flows into capacitor 173 as collector current for transistor component 174. In this way capacitor 173 is charged by a constant current and the voltage of the collector of transistor 174 falls linearly until transistor component 170 is turned "on" again as by the termination of basic horizontal tracking gate pulse $\underline{G}$ and introduction of a positive signal to terminal 168. When such turning "on" action is accomplished, a negative signal is coupled to the base of transistor component 174 causing it to turn "off." If capacitor 173 has charged any, additional transistor component 175 will have turned "off." The collector voltage of transistor component 174 will then rise at a rate determined by the constant current source developed from resistors 176, 177, and 178 and transistor component 179. This constant current charges capacitor 173 through transistor component 170. When the collector of transistor 174 becomes sufficiently positive, transistor component 175 turns "on"; its output ($\underline{Z}$) appears at terminal 169. The output at terminal 169 will be positive from the time capacitor 173 begins to charge until it has been discharged. Such time is a linear function of the distance from the leading edge of basic horizontal tracking gate pulse $\underline{G}$ to the leading edge of the time-coincident error detection pulse $\underline{M}$.

AND gates 165 and 166 in the FIG. 26 arrangement function to gate comparatively positive $\underline{Z}$ pulses when such are time-coincident with a related output of a triggered flip-flop circuit 160 or 161; inverter circuits 64 and 65 are retained to place the gated information in proper negative form for the embodiment of integrator circuit 91 detailed in FIG. 28. Also, the inverted output of circuit 167 provides a positive pulse to AND gate 166 that is the complement of signal $\underline{Z}$ and that represents the measure of the distance of any coincident $+\underline{M}$ error detection pulse from the back edge of basic horizontal tracking gate pulse $\underline{G}$. Thus, in this way the distance from either edge of basic gate pulse $\underline{G}$ to the tracking error detection pulse (target pulse) $\underline{M}$ is represented by the developed pulse width of signal $\underline{Z}$.

Still other desirable performance characteristics may be incorporated into a tracking system tracker unit utilizing the instant invention as shown by the alternate tracker unit embodiment of FIG. 27 and as detailed by FIGS. 28 through 34. A complete description of the alternate embodiment and details, if required, may be obtained from the specification of application Ser. No. 403,398 also filed Oct. 12, 1964, now Pat. No. 3,518,368, and assigned to the assignee of this invention.

I claim:

1. In a tracking system tracker unit which develops electrical tracking error correction signals that control the viewing axis of a television camera sensor unit in tracking relation to a selected target and that are sourced in target marker pulses related to an opposed edge of the target through the television camera sensor unit output video signal and singularly positioned in each line of sensor unit scan in time-coincident relation with a tracking gate pulse to indicate required correction in one direction of two opposed directions, in combination:

(a) summing circuit means having a pair of input channels which each receive a different pulsed tracking error detection signal related to one of said two opposed directions and developing a tracking error correction signal which relates to said one direction and which is based on the singular existence of one different pulsed tracking error detection signal in a given line of sensor unit scan, (b) means developing triggering pulses each of which commences with the start of a tracking gate pulse, each of which ends with a target marker pulse coincident with said tracking gate pulse, and each of which indicates tracking error detection associated with one of said two opposed directions, (c) linearizing circuit means responsive to said triggering pulses and producing tracking error detection signal pulses which comprise said one different pulsed tracking error detection signal and which each essentially constitute an extension of one of said triggering pulses to a total individual time duration which is proportional to the individual duration of said triggering pulse, and (d) separate circuit means conducting said tracking error detection signal pulses from said linearizing circuit means to one input channel of said summing circuit means, said tracking error detection signal pulses each being proportional to the degree of tracking error detected in one of said two opposed directions and increasing the loop gain of the tracking system tracker unit and also of the tracking system.

2. The tracking system tracker unit defined by claim 1, wherein said tracking error detection signal pulses each having a maximum time duration corresponding to the time duration of the television camera sensor unit scan-line period, said linearizing circuit means producing said tracking error detection signal pulses with time durations that each correspond to said maximum time duration when each time-coincident source target marker pulse intrudes into said tracking gate pulse a time distance corresponding to the duration of said tracking gate pulse.

3. The tracking system tracker unit defined by claim 1, wherein the developed tracking error correction signals indicate required correction in an opposite direction to said one direction, said tracker unit including additional circuit means producing other tracking error detection signal pulses which are the complements of said tracking error detection signal pulses relative to the maximum time duration of said tracking error detection signal pulses, said other tracking error detection signal pulses having time durations that are each proportional to the degree of intrusion of target edge marker pulses into tracking gate pulses in said opposite direction and being conducted to the other input channel of said summing circuit means.

4. The tracking system tracker unit defined by claim 1, wherein said separate circuit means includes a gate means gating only that portion of said pulsed tracking error detection signal which is time-coincident with a generally concurrent time period extending from a source target marker pulse to a successive tracking gate pulse, said gate means gating tracking error detection signal pulses which each are proportional to the degree of intrusion of said source target marker pulse into the tracking gate pulse less a time duration corresponding to the time difference between the tracking gate pulse leading edge and the succeeding source target marker pulse leading edge.

5. The tracking system tracker unit defined by claim 3, wherein said separate circuit means includes an additional gate means gating only that portion of said other pulsed tracking error detection signal which is time-coincident with a generally concurrent time period extending from a source target marker pulse to a successive tracking gate pulse, said additional gate means gating tracking error detection signal pulses which each are proportional to the degree of intrusion of the target marker pulses into tracking gate pulses in said opposite direction less a time duration corresponding to the time difference between the tracking gate pulse leading edge and the succeeding source target marker pulse leading edge.

6. In a method of developing a tracking error correction signal to control the viewing axis of a television camera sensor unit in tracking relation to a selected target, the steps of:

(a) forming a comparatively short duration target marker pulse that is identifiable in real-time relation to an edge of said selected target, (b) forming a tracking gate pulse having a fixed time duration in each line of scan that is greater than said target marker pulse, (c) gating said target marker pulse when in time-coincident relation to said tracking gate pulse as a tracking error detection pulse, (d) forming a tracking error detection signal from said tracking error detection pulse and with a time duration which varies linearly in proportion to the degree of time intrusion of said target marker pulse into said tracking gate pulse, and (e) forming said tracking error correction signal from said tracking error detection signal when said tracking error detection signal is in a singularly coincident relation to said tracking gate pulse in a line of scan of the television camera sensor.

References Cited

UNITED STATES PATENTS

| 2,836,421 | 5/1958 | Turner | 273—160 |
| 3,010,024 | 11/1961 | Barnett | 250—203 |

BENJAMIN A. BORCHELT, Primary Examiner

S. BUCZINSKI, Assistant Examiner

U.S. Cl. X.R.

178—DIG 21; 250—203 CT